US010303350B2

(12) United States Patent
Jiang et al.

(10) Patent No.: US 10,303,350 B2
(45) Date of Patent: May 28, 2019

(54) SYSTEMS AND METHODS FOR GENERATING ONLINE DOCUMENTS

(71) Applicant: Hubin Jiang, Reston, VA (US)

(72) Inventors: Hubin Jiang, Great Falls, VA (US); Rui Min, Sterling, VA (US); ShengXing Chi, Fujian (CN); Robert A Kohute, Leesburg, VA (US)

(73) Assignee: Hubin Jiang, Reston, VA (US)

( * ) Notice: Subject to any disclaimer, the term of this patent is extended or adjusted under 35 U.S.C. 154(b) by 775 days.

(21) Appl. No.: 14/717,638

(22) Filed: May 20, 2015

(65) Prior Publication Data

US 2016/0342312 A1   Nov. 24, 2016

(51) Int. Cl.
*G06F 3/05*     (2006.01)
*G06F 3/0484*   (2013.01)
(Continued)

(52) U.S. Cl.
CPC ...... *G06F 3/04845* (2013.01); *G06F 3/04815* (2013.01); *G06T 11/60* (2013.01)

(58) Field of Classification Search
CPC .... G06F 17/211; G06F 17/24; G06F 17/3089; G06F 17/30896; G06F 3/04845; G06F 3/048415; G06T 11/60
See application file for complete search history.

(56) References Cited

U.S. PATENT DOCUMENTS 5,576,951 A   11/1996   Lockwood
5,999,190 A   12/1999   Sheasby et al.
(Continued)

FOREIGN PATENT DOCUMENTS

CA   2896163 A1   12/2013
CN   1882999 A    12/2006
(Continued)

OTHER PUBLICATIONS

"Rellik66", Transparency in MS Paint, 3D Realms Forum Archive, Oct. 16, 2006, online at forums.3drealms.com/vb/showthread.php?t=23012 (Author Unknown).
(Continued)

*Primary Examiner* — Stephen S Hong
*Assistant Examiner* — Hope C Sheffield
(74) *Attorney, Agent, or Firm* — Roberts Mlotkowski Safran Cole & Calderon, P.C.

(57) ABSTRACT

A method and system facilitate online document generation and publication in true What-You-See-Is-What-You-Get fashion without requiring any programming or computer engineering skills. The online document may be a full website with any functions demanded including 3D features. They system includes a graphical user interface module configured to display on a user device display a document on a working area for display to other users over a network and to display tools for a user to manipulate the document, and further configured to receive user input via the user device display, wherein the tools displayed include one or more content objects configured to be placed in a desired location in the document on the working area, and a coordinate system module configured to track absolute positions of the content objects placed in the document on the working area, the coordinates including horizontal position, vertical position, and layer.

23 Claims, 13 Drawing Sheets

(51) Int. Cl.
*G06F 3/0481* (2013.01)
*G06T 11/60* (2006.01)

(56) References Cited

U.S. PATENT DOCUMENTS

| | | | |
|---|---|---|---|
| 6,408,281 B1 | 6/2002 | Shell et al. | |
| 6,633,889 B2 | 10/2003 | Dessloch et al. | |
| 7,047,253 B1 | 5/2006 | Murthy et al. | |
| 7,559,014 B2 | 7/2009 | Naito et al. | |
| 7,908,238 B1 | 3/2011 | Nolet et al. | |
| 8,086,958 B2* | 12/2011 | Tokunaga | G06F 17/211 715/205 |
| 8,346,620 B2* | 1/2013 | King | G06F 17/30011 358/462 |
| 8,661,340 B2* | 2/2014 | Goldsmith | G06F 3/0237 715/203 |
| 9,104,892 B2* | 8/2015 | Le Chevalier | G06F 17/30014 |
| 9,116,890 B2* | 8/2015 | King | G06F 17/30011 |
| 9,195,965 B2* | 11/2015 | Sitrick | G06Q 10/101 |
| 9,323,784 B2* | 4/2016 | King | G06F 17/30253 |
| 9,330,366 B2* | 5/2016 | Sitrick | G06Q 10/0631 |
| 9,519,886 B2* | 12/2016 | Berger | G06Q 10/101 |
| 9,690,403 B2* | 6/2017 | Kreek | G06F 3/041 |
| 9,690,764 B1* | 6/2017 | Batni | G06F 17/227 |
| 9,704,137 B2* | 7/2017 | Berger | G06Q 10/101 |
| 9,711,117 B2* | 7/2017 | Valente | G06F 3/03545 |
| 9,785,619 B1* | 10/2017 | Hill | G06F 17/2235 |
| 2002/0091702 A1 | 7/2002 | Mullins | |
| 2003/0095141 A1 | 5/2003 | Shah et al. | |
| 2003/0126607 A1 | 7/2003 | Phillips et al. | |
| 2003/0135504 A1* | 7/2003 | Elvanoglu | G06F 17/30896 |
| 2005/0060324 A1 | 3/2005 | Johnson et al. | |
| 2005/0160014 A1 | 7/2005 | Moss et al. | |
| 2005/0177584 A1 | 8/2005 | Naito et al. | |
| 2006/0015416 A1 | 1/2006 | Hoffman et al. | |
| 2006/0085275 A1 | 4/2006 | Stokes et al. | |
| 2006/0248442 A1* | 11/2006 | Rosenstein | G06F 17/24 715/205 |
| 2007/0050305 A1 | 3/2007 | Klein | |
| 2008/0255934 A1 | 10/2008 | Leventhal et al. | |
| 2009/0076926 A1 | 3/2009 | Zinberg et al. | |
| 2009/0157497 A1 | 6/2009 | Fusz | |
| 2009/0198577 A1 | 8/2009 | Foreman et al. | |
| 2010/0235364 A1 | 9/2010 | Naito et al. | |
| 2010/0241968 A1 | 9/2010 | Tarara et al. | |
| 2010/0284389 A1 | 11/2010 | Ramsay et al. | |
| 2011/0047013 A1 | 2/2011 | McKenzie, III | |
| 2011/0074766 A1* | 3/2011 | Page | G06T 11/203 345/419 |
| 2011/0145691 A1* | 6/2011 | Noyes | G06F 17/241 715/230 |
| 2011/0191770 A1 | 8/2011 | Inoue | |
| 2011/0238506 A1 | 9/2011 | Perkowski et al. | |
| 2011/0258046 A1 | 10/2011 | Ramer et al. | |
| 2011/0320373 A1 | 12/2011 | Lee et al. | |
| 2012/0005044 A1 | 1/2012 | Coleman | |
| 2012/0010995 A1 | 1/2012 | Skirpa et al. | |
| 2012/0016749 A1 | 1/2012 | Lisbakken | |
| 2012/0109789 A1 | 5/2012 | Bhatt et al. | |
| 2012/0259882 A1 | 10/2012 | Thakur et al. | |
| 2013/0024418 A1* | 1/2013 | Sitrick | G06Q 10/101 707/608 |
| 2013/0073473 A1 | 3/2013 | Heath | |
| 2013/0085812 A1 | 4/2013 | Sharpe et al. | |
| 2013/0132292 A1 | 5/2013 | Lamb et al. | |
| 2013/0325637 A1 | 12/2013 | Jiang | |
| 2016/0132234 A1* | 5/2016 | Riscutia | G06F 3/0483 715/773 |

FOREIGN PATENT DOCUMENTS

| | | |
|---|---|---|
| CN | 101828167 A | 9/2010 |
| CN | 102360480 A | 2/2012 |
| CN | 102456340 A | 5/2012 |
| CN | 104380329 A | 2/2015 |
| EP | 1059599 A2 | 12/2000 |
| EP | 2856330 A2 | 4/2015 |
| JP | 2001-283055 A | 10/2001 |
| JP | 2004-164051 A | 6/2004 |
| JP | 2005-196469 A | 7/2005 |
| JP | 2006-260164 A | 9/2006 |
| JP | 2007-505422 A | 3/2007 |
| JP | 2015516122 A | 6/2015 |
| JP | 2015524957 A | 8/2015 |

OTHER PUBLICATIONS

English translation of State Intellectual Property Office of People's Republic China Search Report issued in Chinese Application No. 201380029942.6, dated Mar. 28, 2017.

Supplementary European Search Report issued in European Application No. 13 730 728.6, dated Dec. 1, 2015.

Communication pursuant to Article 94(3) EPC; EP Application No. 13 730 728.6-1958; dated Jul. 10, 2017.

Notification of Transmittal of the International Search Report and the Written Opinion of the International Searching Authority issued in International Application No. PCT/US2013/044119, dated Mar. 7, 2014.

Wikipedia: "Computer—Wikipedia, the free encyclopedia", Nov. 2, 2001 (Nov. 2, 2001), pp. 1-7, XP055227910, Retrieved from the Internet: URL:https://en.wikipedia.org/w/index.php?title=Computer&oldid=241445 (Author Unknown).

Communication pursuant to Article 94(3) EPC; EP Application No. 13 730 728.6-1222; dated Apr. 12, 2018.

Summons to attend oral proceedings pursuant to Rule 115(1) EPC issued in European Application No. 13730728.6 on Jan. 3, 2019.

* cited by examiner

SYSTEMS AND METHODS FOR GENERATING ONLINE DOCUMENTS

BACKGROUND

The present invention relates generally to online document generation, and more particularly to website building software.

Generating digital documents, such as websites, is usually not a difficult task. A person can use a piece of software commercially available to do so and then save the document as a file. Whoever gets the file can review the document by using the same software that created the file.

However, it becomes a challenge when a person wants to put the document online where everyone can review it without using the software that created the document or without even knowing the software that created the document. Putting a document online requires a skilled person (programmer) who knows how to use a computer program and programming language to put the document into a program format so that a computer server can push the formatted document to a reviewer's computer (client), or let the client pull the formatted document from the server. That makes it impossible for an ordinary person to put a document online without asking for a programmer's help or possessing the skills himself or herself. It is time consuming and inconvenient to the document owner who wants to update the online document frequently and promptly.

In the file situation, all the content within the document are defined and saved in the file. All the content within the saved document in the file are statically sealed. It is another challenge to an ordinary person who wants content to change dynamically according to certain actions, requirements, causes, etc. Publishing online documents with content that can change dynamically and/or in real time requires an even more highly computer skilled person to develop not only programmed content but also a system that works with the programmed content.

Generating online documents that contain 3D content objects is also difficult. It may be relatively simply when using word processor software, where a content object is just inserted into the document saved in a file. However, in an online document environment, the 3D content object must be programmed to stay where you want it on a display screen.

Generating 3D content in online documents is also difficult. 3D content involves a 3D transformation. It must be merged with 2D content in a way that retains the 3D transformation locally for the 3D content.

Another challenge is the document itself. A person may generate a document having a beautiful layout using a commercial software and then save the work as a file, although doing so requires the skill to use such software, at least it requires no programming. To create a similar layout with magazine quality content online requires programming skills, artistic skills, and writing skills, even without the need to change the content within the document dynamically and/or in real time. It becomes extremely challenging for an ordinary person to make high quality online content by himself or herself.

Besides the above, "responsiveness" is another requirement for today's online documents and web design. Responsive Online Document (ROD) or Responsive Web Design (RWD) means having an online document or website that provides an optimal viewing experience—easy reading and navigation with a minimum of resizing, panning, and scrolling—across a wide range of devices (from desktop computer monitors to mobile phones).

Therefore, a system and editor that facilitate generating well designed online documents and website publishing is in high demand. They allow people to update their documents timely and reduces the cost of recruiting and hiring programmers, while eliminating error from translating the content within the document into programmed content. Today, when content selling, content marketing, content generation, and social selling are so important, such system and editor play very important roles in web design, content hosting, ecommerce, and every area where document generation and publishing is involved.

Many document editors have been developed to let people easily generate online content and websites. Most of them provide a user with functions to easily generate plain online documents. Some of them provide drag-and-drop functions that further facilitate online document generation. However, all of them require skilled computer programmers to do high quality and sophisticated layouts. "Drag-and-Drop" means that a user can drag an object from a location of the online document design displayed on a device, such as on the computer screen, and move it to another location. However, documents generated by a Drag-and-Drop editor usually needs to be converted into online displayable documents. Therefore, what you see on the design screen is usually not exactly what you get in the real view screen. There is a mapping between what you see on your design screen and what audiences see online on their screen.

What-You-See-Is-What-You-Get (WYSIWYG) editors, as well as Do-It-Yourself (DIY) editors (all will be referred to as WYSIWYG editors from here on), exist, but sacrifice the flexibility and freedom of document layout and available website functionality. They help users to get started, however, they do not help when the user gets over the initial stage and starts demanding beautiful and high quality online documents.

Needs exist for improved systems and methods for generating online documents.

SUMMARY

It is to be understood that both the following summary and the detailed description are exemplary and explanatory and are intended to provide further explanation of the invention as claimed. Neither the summary nor the description that follows is intended to define or limit the scope of the invention to the particular features mentioned in the summary or in the description. Rather, the scope of the invention is defined by the appended claims.

In certain embodiments, the disclosed embodiments may include one or more of the features described herein.

None of current WYSIWYG editors can support content overlaps and the freedom of positioning content anywhere a user wants within a document. A new true WYSIWYG editor resolves the problems of the prior art and provides users with total flexibility and freedom to design content layout and quality.

Documents can contain many kinds of content or combinations of contents. Of course, a document may contain just one piece of content.

Content may include anything carrying information and/or data, meaningful and/or meaningless, direct or indirect, with or without layout, such as a piece of a photo, picture, map, or anything visual or graphical (i.e. images), text, audio, video, 3D objects, or a combination of any or all those kinds of content.

Content can be 2-dimensional (2D content) that can be framed into a minimum possible rectangle defined by its width and height, or a 3-dimensional object (3D content) boxed by a minimum possible rectangle box defined by its width, height, and depth.

3D content as discussed here is not simply a text displayed or constructed using a 3D font. Rather, it is content that forms a 3D object or is presented in a 3D environment. For example, a piece of content in a document can float out of a surface, rotate, move in three dimensions, and/or perform any other actions in a 3D transformation environment.

A given content may be divisible into portions or pieces. The terms "content portion," "content objects," and piece of content" may be used interchangeably to indicate a discrete portion or piece of content that may be manipulated as a whole and separately from other content. "Items" and "objects" may refer to certain content portions.

A new method and system facilitate online document generation and publication. A novel editor lets users generate and publish online documents in true What-You-See-Is-What-You-Get (WYSIWYG) and/or DIY fashion. An online document can contain many contents. The editor allows a user to put contents anywhere in the document displayed in the screen area and even to have one content overlay another content. The editor also allows a user to put 3D objects in an online document. The editor contains an innovative Presenter Container that holds a program object such as a widget, Apps, etc. Therefore, the editor allows a user to develop an online document, such as a website, with any functions demanded. All which is done by using the editor, without requiring any programming or computer engineering skills.

A new online document generation system includes one or more computing devices comprising one or more processors and configured to execute modules.

The modules may include a graphical user interface module configured to display on a user device display a document for display to other users over a network as a website portion and to display tools for a user to manipulate the document, and further configured to receive user input via the user device display. The tools displayed by the graphical user interface module may include one or more content objects configured to be placed in a desired location on the working area.

The modules may also include a continuous coordinate system module configured to track absolute positions of the content objects placed in the document, the coordinates comprising horizontal position, vertical position, and layer, such that locations of content objects in the document are tracked without reference to other content objects.

The system may also include a repository configured to store electronic data.

The modules may also include a decomposition and integrity organizer module configured to provide information to the graphical user interface module to determine what tools are displayed and how they are displayed, and to send at least some of the received user input to the repository.

The modules may also include a relationship net module configured to record attributes of the document in a net root and to record manipulations of the document in nodes for subsequent restoration of a given manipulated document to the user device display via the graphical user interface module, wherein the information relating to manipulations of the document comprises, for each manipulation of the document, manipulation location information, manipulation size information, and manipulation content information.

The modules may also include a content management system module configured to manage received user input content by saving and deleting content in the repository, converting content formats for storage and/or display, and processing the user input content.

The modules may also include a repository controller module configured to manage the repository by keeping an indexing system for quick information storage and retrieval and managing the repository's database and file system.

The modules may also include a data integration channel module configured to interface between the repository and third party applications.

A new method for generating online documents may include displaying on a user device display a document for display to other users over a network as a website portion and displaying tools for a user to manipulate the document and receiving user input via the user device display, wherein the tools displayed by the graphical user interface module include one or more content objects. The method may further include placing at least one of the content objects in a desired location in the document, tracking absolute positions of the content objects placed in the document, the coordinates including horizontal position, vertical position, and layer, such that locations of content objects in the document are tracked without reference to other content objects, storing electronic data in a repository, providing information to the graphical user interface module to determine what tools are displayed and how they are displayed, sending at least some of the received user input to the repository, and recording attributes of the document in a net root and recording manipulations of the document in nodes for subsequent restoration of a given manipulated document to the user device display via the graphical user interface module, where the information relating to manipulations of the document includes, for each manipulation of the document, manipulation location information, manipulation size information, and manipulation content information.

The method may also include managing received user inputted content by saving and deleting content in the repository, converting content formats for storage and/or display, and processing the user inputted content, managing the repository by keeping an indexing system for quick information storage and retrieval and managing the repository's database and file system, and interfacing between the repository and third party applications.

These and further and other objects and features of the invention are apparent in the disclosure, which includes the above and ongoing written specification, with the drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The accompanying drawings, which are incorporated herein and form a part of the specification, illustrate exemplary embodiments and, together with the description, further serve to enable a person skilled in the pertinent art to make and use these embodiments and others that will be apparent to those skilled in the art. The invention will be more particularly described in conjunction with the following drawings wherein.

DETAILED DESCRIPTION

Figure 1:
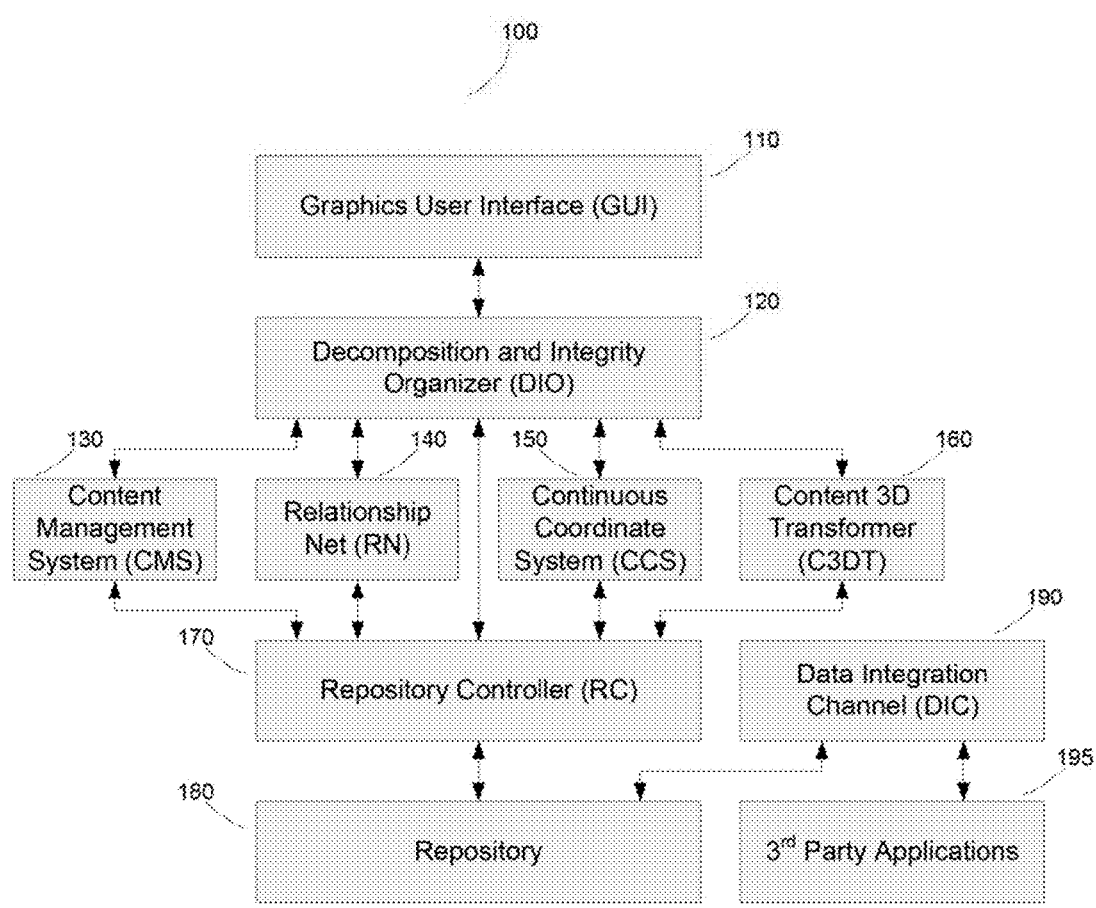
FIG. 1 is a diagram showing an online document generation system, in an embodiment.

Systems and methods for generating online documents will now be disclosed in terms of various exemplary embodiments. This specification discloses one or more embodiments that incorporate features of the invention. The embodiment(s) described, and references in the specification to "one embodiment", "an embodiment", "an example embodiment", etc., indicate that the embodiment(s) described may include a particular feature, structure, or characteristic. Such phrases are not necessarily referring to the same embodiment. When a particular feature, structure, or characteristic is described in connection with an embodiment, persons skilled in the art may effect such feature, structure, or characteristic in connection with other embodiments whether or not explicitly described.

Descriptions of well-known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure. Embodiments discussed herein can be implemented in suitable computer-executable instructions that may reside on a computer readable medium (e.g., a hard disk (HD)), hardware circuitry or the like, or any combination.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited to only those elements but may include other elements not expressly listed or inherent to such process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such non-limiting examples and illustrations includes, but is not limited to: "for example," "for instance," "e.g.," "in one embodiment."

Embodiments of the present invention can be implemented in a computer communicatively coupled to a network (for example, the Internet, an intranet, an internet, a WAN, a LAN, a SAN, etc.), another computer, or in a standalone computer. As is known to those skilled in the art, the computer can include a central processing unit ("CPU") or processor, at least one read-only memory ("ROM"), at least one random access memory ("RAM"), at least one hard drive ("HD"), and one or more input/output ("I/O") device (s). The I/O devices can include a keyboard, monitor, printer, electronic pointing device (for example, mouse, trackball, stylist, etc.), or the like. In embodiments of the invention, the computer has access to at least one database over the network.

ROM, RAM, and HD are computer memories for storing computer-executable instructions executable by the CPU or capable of being complied or interpreted to be executable by the CPU. Within this disclosure, the term "computer readable medium" is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a DASD array, magnetic tape, floppy diskette, optical storage device, or other appropriate computer-readable medium or storage device.

In one exemplary embodiment of the invention, the computer-executable instructions may be lines of C++, Java, JavaScript, HTML, Python, or any other programming or scripting code. Other software/hardware/network architectures may be used. For example, the functions of the present invention may be implemented on one computer or shared among two or more computers. In one embodiment, the functions of the present invention may be distributed in the network. Communications between computers implementing embodiments of the invention can be accomplished using any electronic, optical, radio frequency signals, or other suitable methods and tools of communication in compliance with known network protocols.

Additionally, the functions of the disclosed embodiments may be implemented on one computer or shared/distributed among two or more computers in or across a network.

Communications between computers implementing embodiments can be accomplished using any electronic, optical, radio frequency signals, or other suitable methods and tools of communication in compliance with known network protocols.

It will be understood for purposes of this disclosure that a module is one or more computer processes configured to perform one or more functions, computing devices comprising processors configured to perform one or more functions, or both computer processes and computing devices configured to perform one or more functions. A module may present one or more interfaces which can be utilized to access these functions. Such interfaces include APIs, web services interfaces presented for a web services, remote procedure calls, remote method invocation, etc. While embodiments are described having certain modules carrying out certain functions, in other embodiments the functions of the various disclosed modules may be arranged differently, in other words some or all of the functions of one disclosed module may be carried out instead by another disclosed module, or by an additional module, and/or one or more modules may be eliminated or incorporated into another module.

In the several figures, like reference numerals may be used for like elements having like functions even in different drawings. The embodiments described, and their detailed construction and elements, are merely provided to assist in a comprehensive understanding of the invention. Thus, it is apparent that the present invention can be carried out in a variety of ways, and does not require any of the specific features described herein. Also, well-known functions or constructions are not described in detail since they would obscure the invention with unnecessary detail. Any signal arrows in the drawings/figures should be considered only as exemplary, and not limiting, unless otherwise specifically noted.

The description is not to be taken in a limiting sense, but is made merely for the purpose of illustrating the general principles of the invention, since the scope of the invention is best defined by the appended claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items. As used herein, the singular forms "a", "an" and "the" are intended to include the plural forms as well, unless the context clearly indicates otherwise.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

FIG. 1 illustrates an overview of an editor system 100, which includes a Graphical User Interface (GUI) 110, a Decomposition and Integrity Organizer (DIO) 120, a Content Management System (CMS) 130, a Relationship Net (RN) 140, a Continuous Coordinate System (CCS) 150, a Content 3D Transformer (C3DT) 160, a Repository Controller (RC) 170, a Repository 180, and a Data Integration Channel (DIC) 190.

The GUI 110 is an interface that allows a user to create documents and a document layout in whatever way the user wants. It is an interface that communicates between the user and the editor system to implement what the user wants to create. The GUI 110 can work with any device, i.e. any computer screen with any control devices such as pointers, touch screens, mice, eye controllers, voice controllers, touch keyboards, press keyboards, and other possible control and operation devices. The GUI 110 provides drag-and-drop tools and tools that the user can use to easily translate ideas and/or what the user wants achieve into content in the document on the display device in a WYSIWYG way.

The Decomposition and Integrity Organizer (DIO) 120 controls the way that GUI 110 works. DIO 120 provides data, information, and controls to GUI 110 and commands GUI 110 how that data and information is to be shown, what actions a user is allowed to take, as well as what is communicated between user and editor. Of course, it is up to GUI 110 what tools to present to the user and how the display is organized.

The DIO 120 decomposes input from GUI 110 into contents, coordinates, 3D transformation information, and relationships, and asks Repository Controller (RC) 170 to handle the storage of that information. The DIO 120 ensures that the information about contents, coordinates, 3D transformations, and relationships between them is maintained in the repository 180 so that when it is retrieved from RC 170, it can be sent to GUI 110 in a way that GUI 110 knows how to present that information to the user through a display device.

The editor is based on the Continuous Coordinate System (CCS) 150. The CCS 150 is a true x, y, z coordinate system that allows users to place content anywhere in a document, even overlapping with other content. The CCS 150 also uses an algorithm to realize a responsive online document layout (described in detail below). The x represents horizontal position, y represents vertical position, and z represents the layer. When a user creates a content object in an online document, the editor tracks the <x, y, z> coordinates of the content. With the z coordinate, multiple content objects can overlay (or overlap) each other, with each content object's border and content body merged with another content object's border and content body in a way specified by the user. The CCS 150 is a universal coordinate system which allows the user to specify the measurement unit used, such as inch, screen pixel, etc. In addition to selecting a unit of measurement, the user can set the document size. Document size may be set to any of a variety of standard or user-created fixed document sizes or may be set to be "responsive". The "responsive setting" means that the online document can be displayed on any display device of any size with the layout of the online document remaining the same or being changed in a predefined way. In other words, the layout responds to the screen size according to predefined rules. Since there is no fixed document size for a "responsive" document, and some document sizes may require a rearrangement of content for adequate viewing quality, the coordinates stored in the CCS may in such cases not correspond directly to the layout as displayed. However, the CCS coordinates may be used to predictably decide the displayed layout according to the predefined rules, although in some embodiments and instances some aspects of the displayed layout (e.g. relative placement on the display of certain content objects) may be determined manually and not by the predefined rules.

Currently, the most advanced editors use a row and column position system called a "fluid system". The row refers to one row of content objects. The column refers to one column of content objects. The row and column position system does not care about the size of the content objects. In the row and column position system, there is no content overlay since a content must be placed below or above a previously placed content object in an online document (next row) or placed right or left to a previously placed content object (next column). Therefore, with a row and column position system, a user is not able to place a content object at the bottom of an online document without filling in a content object or multiple content objects before (or above) that content object. A user is not able to overlap contents either. The row and column position system was designed to avoid the challenge of being responsive to changing screen size. The new editor overcomes the challenge of being responsive in a different way, by using a sequence algorithm as described in detail below. And, the innovative editor uses a universal <x, y, z> coordinate system to realize continuous positioning of each and every content object, and to offer unlimited ways for the user to do what they want to do, with the freedom to place content objects anywhere and even to overlap each other.

The new editor has a Content Management System (CMS) 130. The CMS 130 manages the user's content input from GUI 110 through DIO 120. The CMS 130 saves and deletes content through RC 170. The CMS 130 may also do content format conversions between DIO 120 and RC 170 since display and storage may require different formats. The CMS 130 may also provide processes to the content such as spellchecking, content auto generation, content search engine optimization (SEO), content indexing, content matching, data mining, data analysis, media networking, marketing, searching, etc. CMS 130 may provide a spellchecking function that interacts with a user through DIO 120 and GUI 110. Such a function checks what a user enters in real time or as demanded, automatically or manually, against a stored word directory to provide spell checking, correction, suggestions, and other language related functionality. CMS 130 may also provide editing functions for photos, images, video, audio, and other media and content. CMS 130 may provide functions that suggest template(s) for stories, websites, media sites, blogs, and any other way to organize user contents into any format, fashion, publication, etc. Such functions may also perform content auto generation, for example generating stories based on a user's input of key words, by interviewing the user, etc. CMS 130 may also set up rules to extract key words, indices, core sentences, and other essential element(s) from user contents in order to fit the user contents into online search engines so the user contents can be found easily by others. The CMS 130 may also perform all kinds of other functions such as, not limited to, content indexing, content matching, data mining, data analysis, and searching to perform tasks the user wishes. The CMS 130 may also conduct social networking functions such as content sharing by sending content to other people or servers, social commenting, ranking, etc.

The Content 3D Transformer (C3DT) 160 applies 3D transformations to content, so that content can be placed onto a 3D object or surface of the 3D object and become a natural part of the 3D object. The C3DT contains an algorithm that takes 2D content and segments the content into areas according to the 3D transformation of a given object, and then attaches the segments to the 3D object. For example, to place photographic content onto a cube, the content may be segmented into six square areas, which are then attached to the six faces of the cube. The C3DT 160 can also transform a content object into a 3D content object and/or display the content in any 3D way. This 3D transformation should not be confused with the CCS 150. The CCS 150 positions a content object in an online document, while the C3DT 160 transforms a content object into 3D content, or content married with a 3D object, or forms an area in the online document where a 3D object can naturally be placed in an online document. The C3DT 160 has another important function, which is to transform a piece of content into a 3D environment where the piece of content can float, rotate, and perform other 3D actions. The C3DT in an embodiment is described in more detail with reference to FIG. 7.

The Relationship Net (RN) 140 is a system that relates all the content and other objects together into an online document. Each node of the RN 140 represents a content object with unique identification number (ID) as well as attributes such as content body, coordinates, relations to other contents such as nesting, overlap, border characteristics, rules for overlay merges, rules for border merges, color, etc. The RN in an embodiment is described in more detail with reference to FIG. 6.

The Repository Controller (RC) 170 manages the repository of information that is necessary for recovering an online document. It keeps an indexing system for quick information storage and retrieval and manages a database and file system. All database and file systems are saved in Repository 180.

The Data Integration Channel (DIC) 190 provides an interface to third party applications that want to talk to the editor system. With DIC 190, online document generation can be done automatically and programmatically. A user may set up a document template where each content object is assigned a unique ID. A $3^{rd}$ party application may input content programmatically through DIC 190 and specify what portion of the content is for association with which content object in the template, and therefore, the document can be controlled by the $3^{rd}$ party application automatically and programmatically. Similarly, since the content in a document is separated into content objects, each content portion may be marketed differently from the others. For example, one content portion associated with a first content object in a document may be sent to one group of people and another content portion associated with another content object in the same document may be sent to another group of people, and each content portion may have a different scheme of indexing or key word extraction and be sent to different search engines for SEO.

Figure 2:
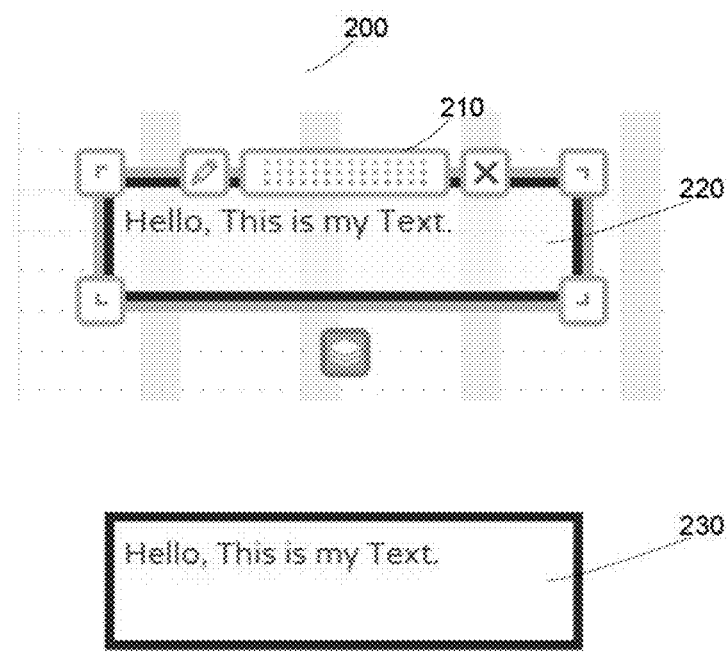
FIG. 2 is an illustration of a content object with editor tools in a document, in an embodiment.

Once a document is generated, the editor saves the document as described above. The method to save the document can vary as a person of skill in the art knows. However, whatever a person can do is within the scope of the invention disclosed herein. The same saved information and data are used for editing and for publishing purposes. For editing, the editor wraps editor tools 210 around each content portion 220 dynamically as illustrated in FIG. 2, so a user can drag and drop, edit or continue editing the content. For publishing, DIO 120 recovers a document and puts the document into the format of any display software such as web browser software including Internet Explorer (IE), Chrome, Firefox, Safari, etc. and sends the document to that display software for display. The published content 230 is the same as shown during the design process in the editor. FIG. 2 shows an example of a text content object.

The editor implements a method to save the design automatically during editing. Therefore, if the design window gets closed accidently for any reason before a design is saved, a user can always recover the latest design.

The editor system 100 may be implemented as client-server system or standalone system that has everything implemented in a single machine or single program. It is totally flexible what is implemented on the client side and what is implemented on the server side if the editor is implemented in client-server architecture. For example, a skilled person can implement everything on the client side and only keep the Repository 180 on the server side, so the client side machine uses its local computing power to do everything and saves the server side's requirements for computing power and Internet bandwidth. Or, a skilled person may only implement GUI 110 or GUI 110 and DIO 120 on the client side, keeping the rest on the server side in order to gain more control from the server. Implementation can be done using computer languages such as, but not limited to, Java, C, C++, Javacript, HTML, CSS or any platform or combination. It can also be implemented as a browser-based web application or as a website that works for any Internet browser without installation of any software at the client site.

WYSIWYG Sketchpad

A WYSIWYG Sketchpad editor (called Sketchpad) consists of a Graphical User Interface (GUI) 110, Decomposition and Integrity Organizer (DIO) 120, Continuous Coordinate System (CCS) 150, and Relationship Net (RN) 140.

The Sketchpad is where a user designs and generates online content and/or creates a document, such as website.

The Sketchpad lets users 1. position content anywhere in the document;

2. position a content object inside of another content object. Therefore, two or more content objects may overlap each other to form multiple layers with the ability to set up the layers' attributes such as opacity, the way borders merge, the way contents merge, the sequence of the contents such as front, back or middle, etc.;

3. specify nest relationships among contents. Therefore, one content object (the "Container Content") may contain many others (the "Nested Content"). When a Container Content moves around the document, all Nested Contents move accordingly and together with the Container Content;

4. specify an area inside the document as a "Sub Sketch Area" inside which a user can do whatever can be done in the document. When a Sub Sketch Area moves around inside the document, all items inside the Sub Sketch Area move accordingly and together with the Sub Sketch Area;

5. set up the document as a statically defined document size or as dynamically defined as responsive defined document size. Statically defined document sizes frame an online document into fixed sizes such as 8.5"×11" (or "letter size"), 8.5"×14" (the "legal size"), etc. Responsive defined document size sets up the size of an online document as changing dynamically according to the size of a user's display screen, automatically or as per predefined rules;

6. generate online documents in a WYSIWYG way. When a user sets the size of the document as responsive, the document's area becomes the area of the user's display screen. The online document is displayed exactly as the user sees it on the design screen, the same size, the same layout, the same feel and look, etc.

Figure 3:
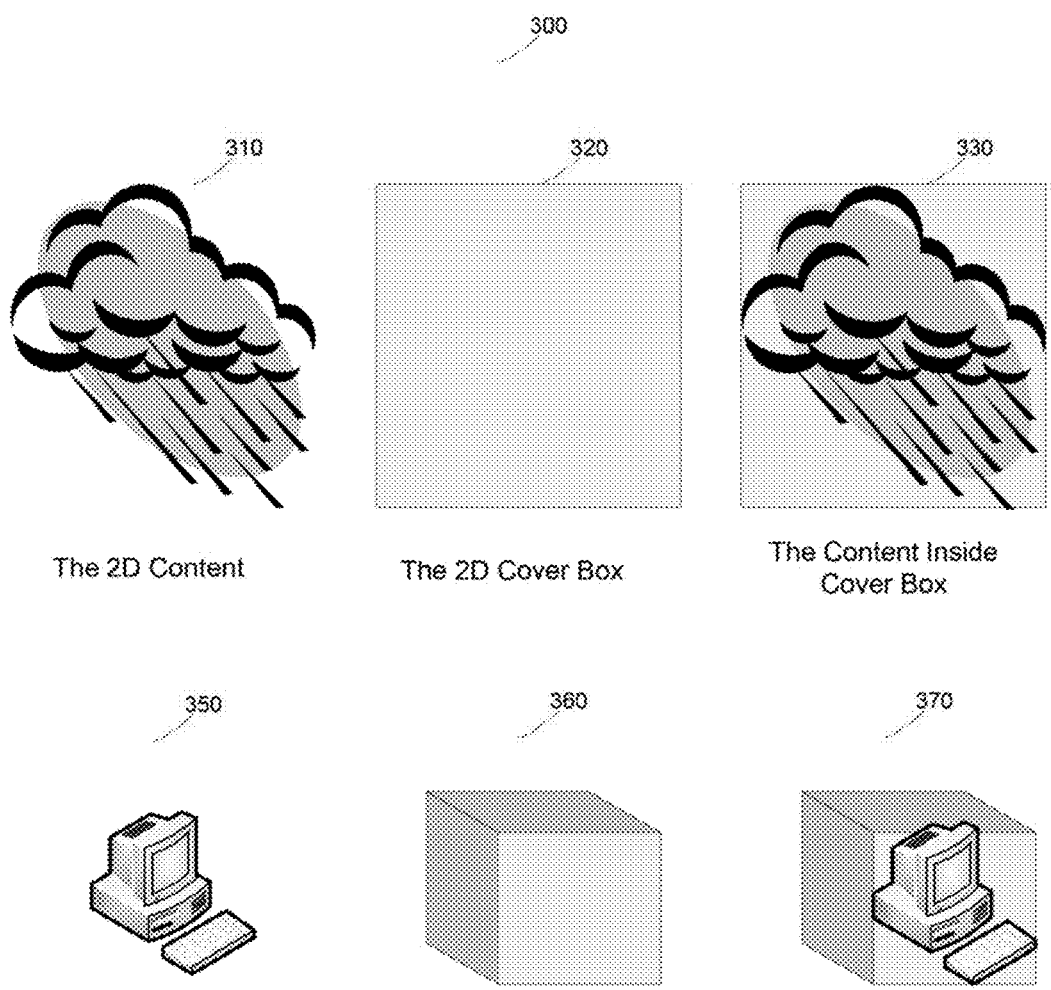
FIG. 3 is an illustration of cover boxes used to define the size of 2D and 3D content objects, in an embodiment.

In order to define the position of a content, a Cover Box concept is used. Any content, no matter what the shape (e.g. circular, square, rectangular, irregularly shaped, etc.) has a minimum size square or rectangle or box capable of containing all the content (the "Cover Box"). FIG. 3 illustrates examples of Cover Boxes. Content object 310 is an example of 2D content, cover box 320 is the minimum-size rectangle frame that fits over the content object 310 as shown in 330. Content object 350 is an example of 3D content, the cover box 360 is the minimum sized 3D box that fits all the 3D content 350 inside it, as shown in 370. The cover boxes have sides that are perpendicular to the horizontal and vertical (and for 3D boxes, depth) axis of the document—in other words the cover boxes are not rotated even if that would allow for a smaller-sized cover box.

$<w, h, d>$ is used to specify the size of a Cover Box, where w is the width of the Cover Box, h is the height of the Cover Box, and d is the depth of the Cover Box. In the 2D content situation, d=0.

The invention uses an $<x, y, z>$ coordinate system to grid the document. The z is a virtual coordinate that the Sketchpad uses to control the layer relationship of contents. The x and y coordinates specify the starting point of a content object, i.e. the Cover Box's top left corner. In a 3D object situation, the x and y specify the starting point of an object, i.e. the top left corner of the Cover Box's front surface (the surface facing the user).

Therefore, based on the continuous coordinate system a user can specify the measurement units as desired. The unit can be inches, cm, pixels of display screen, etc. A content or object may be placed anywhere in the document. In terms of measurement unit, the continuous coordinate system becomes a universal coordinate positioning system, continuous and not just block by block such as in row and column positioning systems. The continuous coordinate system allows Sketchpad to set up a grid based on different measurement units. A user can use such a grid to align contents and objects and to snap contents or other objects to the grid or to position a content object or other object without losing positional freedom.

In responsive mode, the Sketchpad allow a user's entire display screen to be used as the document area, realizing a full WYSIWYG implementation. Responsive mode may be the generic mode for all online documents whether or not the document size is predefined. Therefore, below the responsive mode is referred to without losing the genericity and coverage for predefined document sizes.

The WYSIWYG editor meets the following responsive requirements:

If an audience who reviews an online document has the same size display screen as the designer who put the online document together, the audience sees exactly what the designer saw on the designer's screen after the design process;

However, if the audience's screen has a different size than the designer's, the contents and other objects change size according to the ratio of the two screens.

If the audience's screen size is dramatically different from the designer's, such as an iPhone screen vs a PC's screen, then not only the size of contents and objects needs to be adaptive, but also the screen layout has to be changed automatically or according to predefined rules to ensure legibility and eliminate the limitation of small screens.

Responsiveness is achieved by resizing the coordinates of all the items in the document. However, there are limitations to such resizing when the size of the display (width and height of the display in pixels or in other units) becomes so small that resizing becomes impossible or the content loses resolution and legibility. For example, when an online document designed on a PC screen needs to be displayed on an iPhone screen, it becomes impossible to resize everything and still keep the original layout. In that case, the layout must be re-arranged in order to display the content on the iPhone in a reasonable order so the context remains most meaningful among content blocks. The threshold where layout rearrangement becomes necessary may be set manually by the user or automatically by default. The threshold may be set for example by text size—e.g. if text cannot be displayed at least at a 10 point font size, the layout is changed to allow the text to stay at 10 pt size- or by some other factor or combination of factors, such as % of original image size, resolution, etc.

Such display order can be specified in the editor manually by the user, or automatically by any algorithm, or using a hybrid method combining manual and automatic operations. The algorithm may be set explicitly by the user or selected from a pre-defined list. As an example, one possible algorithm is called the Sequence Algorithm. The algorithm and operation may in some embodiments be implemented in CCS 150, while in other embodiments they may be carried out in one or more other modules.

Figure 4A:
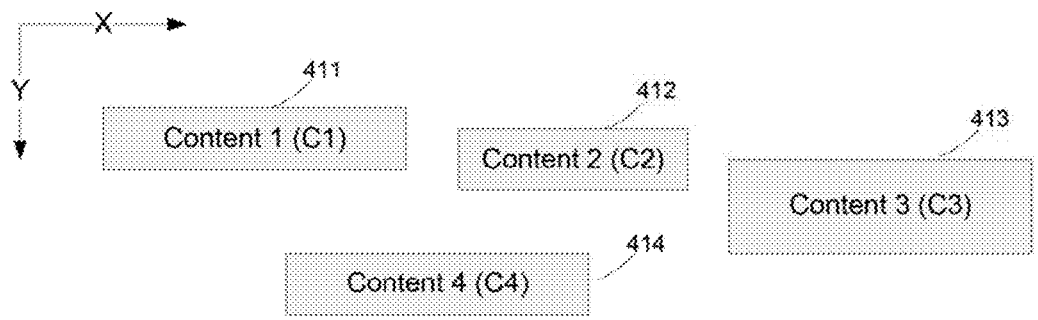
FIGS. 4A-C are diagrams showing operation of a layout sequencing algorithm, in an embodiment.

Sequence Algorithm:
1) Set all z coordinates equal to 0, so all the contents and Cover Boxes of 3D objects are pressed onto a 2D surface;
2) Set all d equal to 0, so all Cover Boxes become 2D rectangles;

FIG. 4A is an example of results from steps 1 and 2;

3) Set i=1 to start;
4) Scan coordinates of the above transformed contents from left to right in the X direction and from top to bottom in the Y direction so that first the top-most row is scanned left-to right, then the second row from the top is scanned left-to-right, etc.;
5) Find the first unmarked content portion whose top left corner is hit by the scan (the Reference Content). Mark the Reference Content as C?-i. In the FIG. 4A, it is Content Portion 1 411, so ?=1, mark it as C1-1.
6) Scan in the X direction in the area of the height, h, of the Reference Content. If there is a content portion whose height is at least 50% covered by the height of the Reference Content, mark the content portion as C2-i. In the current case, it is Content Portion 2 412, marked as C2-1.
7) Find and mark all such C?-i that meet the conditions in step 6;
8) Set i=i+1;
9) If there is still content not scanned, go to Step 4 to scan those contents that have not been marked yet;
10) For each group i, follow steps 11-15;
11) Set j=1
12) Scan all content portions in the group from left to right and top to bottom as in Step 4;
13) When a top left corner of a content portion is found, mark the content portion C?-i.j;
14) Set j=j+1;
15) If there is still a content portion in group i that is not scanned, return to step 12 to scan those content portions not yet marked according to step 13;

After the scan is completed, all contents that are not decided by the above steps are presented to the user to decide manually.

Figure 4B:
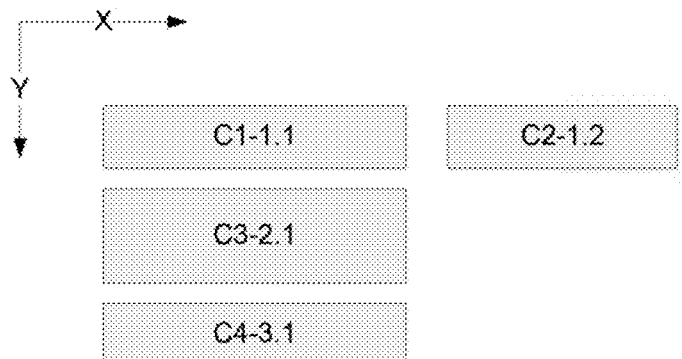

After the Sequence algorithm, all contents are labeled. For example, FIG. 4B shows the results for the current example.

Figure 4C:
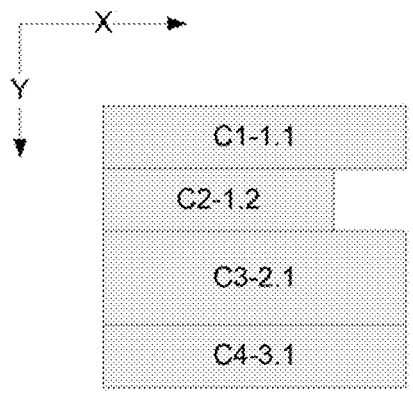
Figure 5:
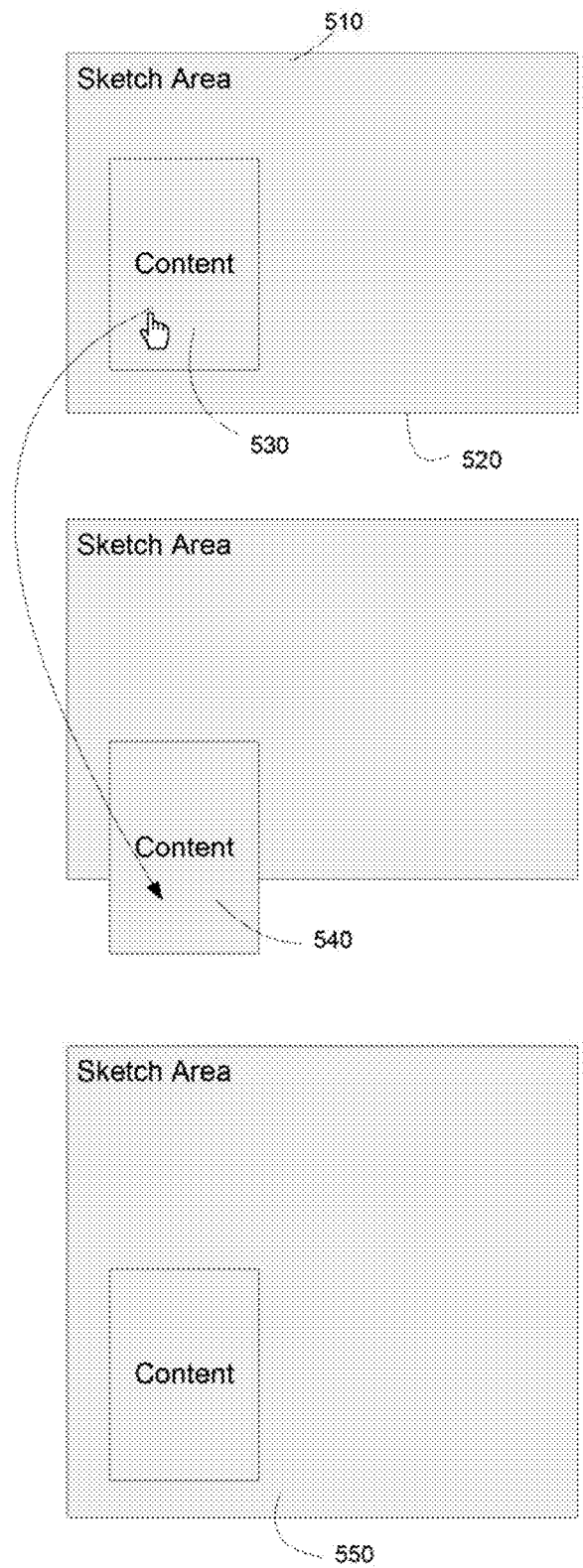
FIG. 5 is a diagram showing enlargement of a document responsive to repositioning of a content object in the document on a working area, in an embodiment.

The responsive display of the contents proceeds in the ij sequence from top to bottom. For example, in FIG. 4C C1-1.1 goes first because i=1 indicates the first group considered and j=1 indicates the first content portion to go in the first group; then C2-1.2 goes next because i=1 and j=2 indicates the second content portion to go in the first group; then C3-2.1 goes next because there are no more content portions in the first group, and i=2 and j=1 indicates the second group considered and first content portion to go in the group; then C4-3.1 goes next; and then there are no more C (content portions) to consider. A responsive display of the document on an iPhone looks like FIG. 4C. After the ij sequence is completed, all content portions manually placed by the user are inserted into their chosen places. As illustrated in FIG. 5, the bottom 520 of the document area 510 of the document expands down automatically if a user drags a content object 530 and intends to drop it on the bottom line of the document area or beyond. In that case, the document area (or the bottom line) expands downward as illustrated in 550. In the case of a predefined document size, the editor automatically expands a new page for placement of the content object.

Relationship Net

The Relationship Net (RN) 140 records what happens on the document in the Sketchpad. So, an online document can be recovered in GUI 110 and therefore displayed on a designer's screen for design and editing or on an audience's screen for online review.

Figure 6:
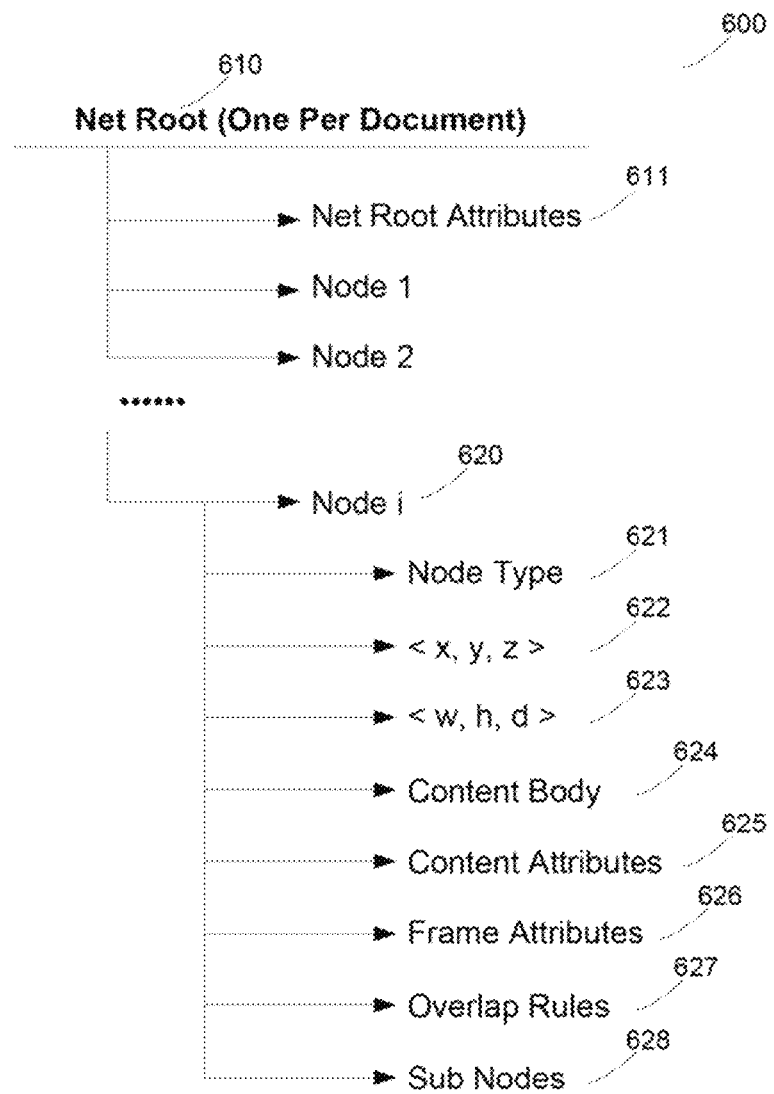
FIG. 6 is an illustration of a relationship net node structure, in an embodiment.

As illustrated in FIG. 6, one document is recorded in one Relationship Net 600. The starting node of the Relationship Net is the Net Root 610. There is a unique ID assigned to the Net Root, representing a document. Net Root Attributes 611 contain information about the Net Root such as document name, author information, date and time that the document was initially created, date and time that the document was last updated, thumbnail, descriptions, and anything else that a skilled person wants to add. The Net Root may also contain other things other than attributes that a skilled person wants to add. Every content object in the document, such as content, 3D objects, Presenters, Button Controls, and anything that the editor may have in the future to allow a user to do something, is recorded in the Relationship Net as a node. There are as many nodes 620 as a user wants. All items under a node 620 can be the item's value itself or a pointer to its value located in the repository (file system or database or other format) or somewhere else the values can be stored. Each node presents some content in a document and is assigned a unique ID.

Node Type 621 specifies the kind of node. The Node Type may be Content, 3D Object, Presenter, etc. The Node Type helps the editor to put proper tools around an item so a user can edit the item in editing mode.

<x, y, z> 622 is an item's position coordinates as described above.

<w, h, d> 623 is an item's size as discussed above.

Content Body 624 is the actual content of an item. Content Body usually contains formatted content including color, font, size, and other information that is necessary for content formatting. However, it can be arranged any way as long as there are ways to recover the content for review.

Content Attributes 625 are the metadata about the content, such as date and time that the content was created, the content author, etc.

Frame Attributes 626 are the control information defining the shape, color, size, etc. of the border around the content.

Overlap Rules 627 define how the content overlap happens, such as whether the borders of the overlapping content should merge, opacity, sequence, etc.

Sub Nodes 628 list all the items that are nested inside of the current item.

The Relationship Net can be expanded by skilled person to represent all the relationships and structure of a document, so a document can be recovered and manipulated.

Content 3D Transformer

Generating 3D online content is a challenge. It usually requires programming. The Content 3D Transformer (C3DT) eliminates the programming requirement and allows a user to generate 3D online content without programing or having technical skills. The 3D content discussed herein goes well beyond simply text displayed or constructed using a 3D font, in which case the shapes used (letters) are known in advance and corresponding 3D objects are simply selected from a pre-defined catalog of shapes with 3D appearance. Rather, the C3DT may be capable of taking any existing 2D or 3D content, the nature (e.g. shape, appearance) of which is not necessarily known in advance, and transforming that content into a 3D object and/or presenting it in a 3D environment. For example, a piece of content in a document can float out of a surface, rotate, move, and/or perform other actions in a 3D transformation environment.

Figure 7:
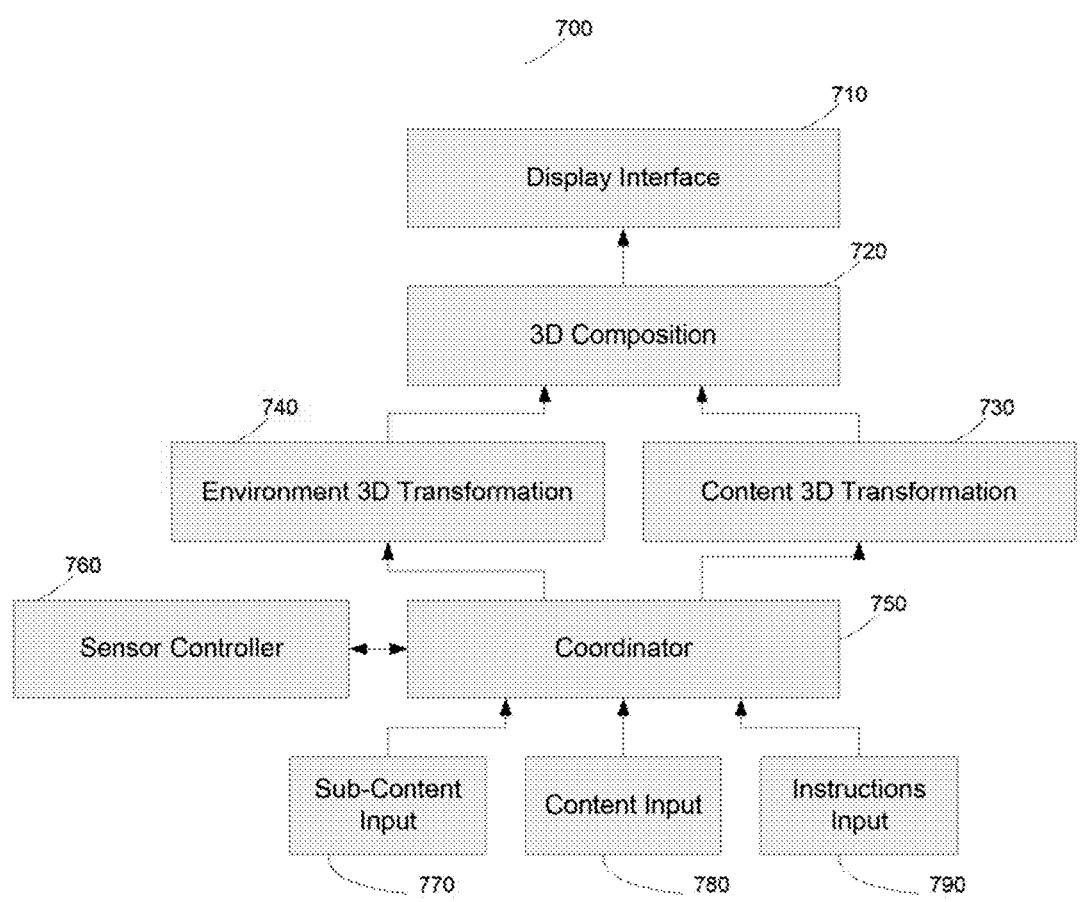
FIG. 7 is a diagram of a 3D content transformer, in an embodiment.

The Content 3D Transformer (C3DT) 700 is illustrated in FIG. 7. The Sub-Content Input 770 allows a user to specify an area in a content object or a content object from a document, called a sub-content, takes the sub-content along with its <x, y, z> coordinates and <w, h, d> information, and provides them to Coordinator 750 for processing. The Content Input 789 allows a user to provide new content that may be different from content in the current document and provides the content to Coordinator 750 for processing. The Instruction Input 790 allows a user to specify what needs to be done to the sub-content and/or content input to the Coordinator 750. Instructions may be to transform the given content into a 3D object specified in the instruction, to transform the given content with an effect such as floating, rotating on the surface of a card having two faces, putting the content on a surface of a cube and rotating the cube, etc. The Sub-Content Input 770, the Content Input 780, and the Instruction Input 790 may be interfaced with a $3^{rd}$ party application and accept inputs programmatically or automatically without a human being intervening.

When a sub-content is specified, information about the sub-content is recorded as a node in the Relationship Net. Also, the Coordinator 750 records the information in Repository 180 so that it knows what to do later on when the Decomposition and Integrity Organizer (DIO) 120 asks it to perform some operation on it. The Coordinator 750 also works with and manages a Sensor Controller 760. The Sensor Controller 760 tracks the behavior and actions of interaction devices such as computer mice, touch screens, keyboards, scrolling devices, even sensors for eye sight tracking, head movement tracking, body movement tracking, etc. Events and control signals of those devices are input to the Coordinator 750 for processing. The Coordinator 750 uses those events and signals to command the movement of content and/or objects as well as the environment, such as floating, rotating, lighting, animation, and other actions with directions, speed, color, sound effects, or motion effects, etc. The events and control signals from Sensor Controller 760 are used to control how content and objects in the content react. For example, after a piece of text is made to float out of the content, a user can use a mouse or touch screen to control the height of the floating text above the content, rotate the text in all directions and angles, and control other kind of effects associated with the text. A user can use the system 700 to wrap a lighting shadow around a piece of content in a document or an object in the content and use a control device such as keyboard arrows to make the shadow brighter or darker. If a content portion is a game piece, a user may use game controllers to interact with the game program, control the animation with speed, color, sound effects, motion effects, etc. and play the game. All the events and control signals from those controller devices are sent to Sensor Controller 760, and the Sensor Controller 760 in turn sends them to Coordinator 750 for processing.

According to instructions, the Coordinator 750 sends the sub-content and/or input content to Content 3D Transformation 730, where the sub-content and/or input content are transformed into a 3D format if so instructed. Otherwise, the sub-content and/or input content pass through in their original form.

According to the instructions, the Coordinator 750 commands the Environment 3D Transformation 740 to create a 3D environment where the sub-content and/or input content processed by the Content 3D Transformation 730 is shown and/or where the sub-content and/or input content is merged. The Environment 3D Transformation 740 generates 3D objects such as cubes, pyramids, cards, etc., and/or creates floating environments, lighting environment, etc.

The 3D Composition 720 then uses output from the Content 3D Transformation 730 and the Environment 3D Transformation 740 and fuses the processed sub-content and/or input content into the 3D environment, performs animations according to instructions from the Coordinator 750, and interacts with a human being according to instructions from the Coordinator 750 that are input from the Sensor Controller 760 in real time. For example, the 3D Composition 720 can map sub-content and/or content on a 3D object like a cube, pyramid, etc. It can put the sub-content and/or content into a floating environment, so the sub-content and/or content looks like it is floating above the original content or document surface, and a human being can control the height of the floating and rotate the floating sub-content and/or input content.

If interaction requires dynamic change in the environment and/or the sub-content and input content, then all the actions may be carried out through the Coordinator 750, then in turn through the Content 3D Transformation 730 and the Environment 3D Transformation 740 to perform real time 3D transformations. However, it the output from the 3D Composition 720 does not need to change dynamically, in other words, the output becomes statically formed, then the Sensor Controller 760 can connect directly with the 3D Composition 720 or Display Interface 710 and work there with a human controlling the output from the 3D Composition 720.

The output from the 3D Composition 720 is displayed on a screen device through the Display Interface 710. The Display Interface 710 is a part of DIO 120. It makes sure the output from the 3D Composition 720 is converted or processed to fit a specific display device such as a PC screen, iPad screen, iPhone screen, or some other device that can generate output presentation for a machine, human, or program applications.

Data Integration Channel

The editor also makes automated document generation possible. The editor's special structure allows content, relationships and nodes, and coordinates to be created without participation of a user. The editor may create a document with an automatically generated layout for given content. The content may be dynamically replaced or selected with given criteria and logics. Therefore, an online document can change by itself dynamically and in real time. Rules and methods may be attached to the editor to generate online documents automatically. All the functions may be performed through Data Integration Channel (DIC) 190, which works with Repository 180 and Third-Party Applications 195. The Third-Party Application 195 itself is not part of the invention, but the function of being able to integrate with any Third-Party Application is. A Third-Party Application 195 may be in any form. It may be a web-based application that works with system 100, or it may be an application that calls APIs provided by DIC 190 and becomes a part of the system 100, or it may be a script component in a program such as a web site, HTML program, etc. that calls functions in DIC 190, or it may be a database or database system to work with system 100 through network protocols and program, or it may be a wireless application that works with system 100 through wireless applications.

Universal Content Presentation

The editor may also provide a "Presenter Container". The Presenter Container can hold a program object called a "Presenter". The Presenter is a program object developed with a computer program to take an input content and present it to the audience in the way that the Presenter wants. A Presenter may be implemented as a widget or App or a program developed in object format.

Figure 8:
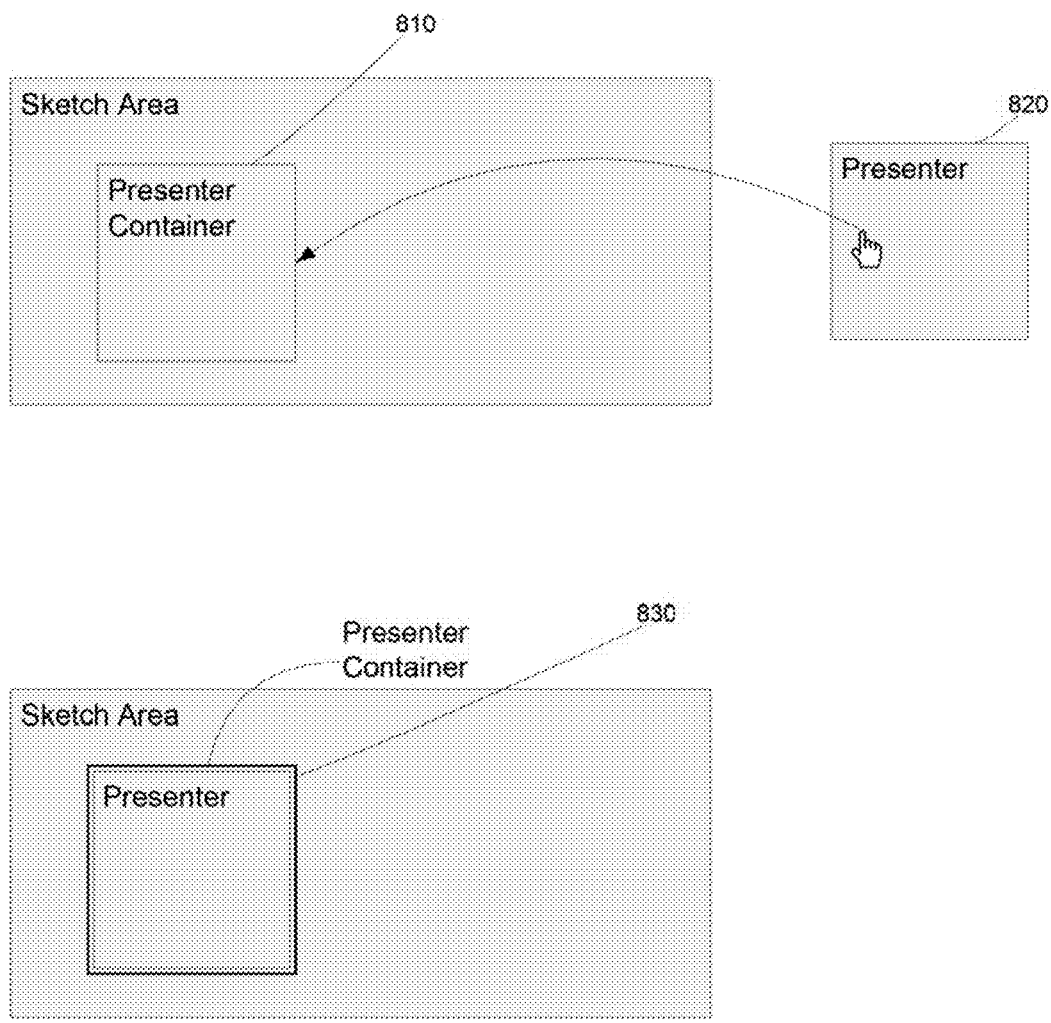
FIG. 8 illustrates the placement of a presenter within a presenter container in a document, in an embodiment.

As illustrated in FIG. 8, a user can drag the Presenter Container 810 from the Sketchpad, and drop it on the document, then drag a Presenter 820 from a Presenter Library and drop it on top of the Present Container. The Presenter merges into the Presenter Container, or in other words, the Presenter Container holds the Presenter and works together with it 830.

On the document, the Presenter Container 810 can be moved with a WYSIWYG tool. It is recorded similarly to a content object in the Relationship Net. A user can drag Presenter Containers from the editor and drop them anywhere in the document. A user can have as many Presenter Containers as the user wants in the document. The computer programmed object such as widget or App can perform as many web functions as a user wants, as long as the user provides such an object program for a Presenter Container to hold. Therefore, the editor is not only an online document editor, it is also an editor that builds any document, such as a website, for the user. By using the innovative editor with Presenter Container, a user can build a web site offering a 3D game, ecommerce, an information portal, social media, social networking, etc. The type of offering depends upon what kind of computer programmed object a user provides to a Presenter Container. If a user provides a game program, whether or not the game is 2D, 3D, or virtual reality or other future technologies, the area where the game object's Presenter Container is located will be a game area. After the document is published, any user is able to play the game in the area where the game is placed inside the document. Similarly, a computer programmed object may be developed as an ecommerce store, an information portal, a social media portal, a component that does social networking, or another component with other different functions.

Figure 9:
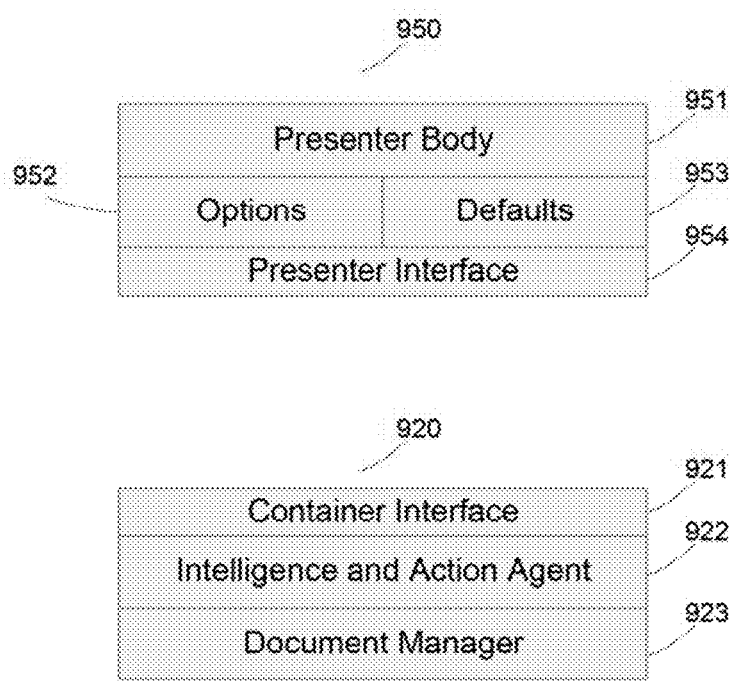
FIG. 9 illustrates a presenter container and a presenter, in an embodiment.

A Presenter Container is a base or foundation for a Presenter. A Presenter Container provides inputs to the Presenter sifting within it. It also provides information or commands for the Presenter to process. It controls some actions that the Presenter wants to take. However, it does not do what Presenter is developed to do. As illustrated in FIG. 9, a Presenter Container 920 consists of a Container Interface 921, Intelligence and Action Agent 922, and a Document Manager 923.

The Container Interface 921 provides an interface to a Presenter. The Container Interface 921 contains communication protocols that recognize the authorized Presenter. Therefore, when a Presenter is plugged into a Presenter Container, both merge as if they were one unit and work together. A Presenter becomes an authorized Presenter at the moment when a user puts the Presenter on a Presenter Container. The Container Interface 921 assigns a unique ID to the Presenter that sits on it and passes its own unique ID to Presenter Interface 954. All future communications are between the matched Presenter Container and Presenter until the user detaches them. The innovative system and method allow the possibility of running unlimited applications on the system without the need to know in advance what functions future applications will have and allow developers to develop their applications without needing to know how to connect to the backend.

The Document Manager 923 lets a user specify what documents can be provided to a Presenter to process, or lets a user specify rules regarding how documents in the document repository can be provided to a Presenter for processing. In the earlier case, all the documents are statically specified. In the latter case, all the documents are decided dynamically according to the rules specified. The rule can be something like all documents after a certain date or time, all documents about a person, documents containing specified words or meanings, etc. The Document Manager 923 keeps track of the documents that are needed by the Presenter and makes them available to the Presenter, one by one or group by group according to requests from the Presenter. For example, a user may set up a rule in the Document Manager 923 that the documents to be provided to the Presenter are those about Albert Einstein. The user's Presenter may be an application widget that categorizes documents about Albert Einstein into categories like Life, Physics, Prize, etc. When people want to see all documents about Albert Einstein's life, the Document Manager 923 provide all the documents about Albert Einstein's life to the Presenter for the Presenter to display to people. How a document is displayed will not be Presenter Container 920's concern, it will be decided solely by the Presenter.

The Intelligence and Action Agent 922 provides intelligence about the environment of the Sketchpad, such as background color, picture, etc. to Presenters. According to the intelligence, a Presenter may perform some action. For example, if the Sketchpad has a black background, that means the document, such as a website, generated will have a black background, and the Presenter may set its background black to match. The Intelligence and Action Agent may also control some actions and behaviors that a Presenter wants to do but that may be considered threatening to the editor system. For example, a developer might develop a presenter to hack the editor system in order to alter content and/or do other damage, or to pass a virus to the editor system, or to bypass the editor system.

As illustrated in FIG. 9, a Presenter 950 consists of Presenter Body 951, Options 952, Defaults 953, and Presenter Interface 954.

The Presenter Body 951 is the engine part of the program object, which implements what a programmer wants to do with the documents provided by its Presenter Container 920. For example, the Presenter Body 951 may display all the documents, one every five seconds, the Presenter Body 951 may display a video as background and all other documents on the top as the foreground, or the Present Body 951 may not take any document from its Presenter Container 920U, but instead execute a computer game for an audience to play or execute other applications.

Options 952 sets options for its Presenter 950 such as background color, border size and color, etc. Options 952 can be dynamically chosen or statically chosen at the time of design, depending on how the Presenter Body 951 is programmed. The appearance customization of a Presenter 950 can be done statically through the user interface of Container Interface 921. Of course, for it to work, the Options 952 must contain the options data.

Defaults 953 sets up the default values for a Presenter 950, such as a thumbnail for display, preview data for a user to see what the Presenter 950 may look like in real time, etc. When a user selects a Presenter to use, it makes the selection process easy and quick if the Presenter can show a thumbnail that visualizes what it may do and/or a demo that demonstrates how It works. It is difficult if a user has to select a Presenter, set documents for the Presenter to process, and turn it into a real model (published model) to see how the Presenter works and how it processes the documents in order to make the decision whether or not to use the Presenter. Therefore, it is very user-friendly to the developer if a Presenter saves a thumbnail that best presents the Presenter visually and default data (or documents) that the Presenter can use to show a demo to facilitate a user's Presenter selection process.

The Presenter Interface 954 is programmed to have the same communication protocol as Container Interface 921 so that they can recognize each other and work together.

Independent SEO in a Single Online Document

The editor's structure allows SEO to happen in one document separately for different content objects. Different content objects in the same document may be SEO'd differently since they are independently built by the editor. Since each piece of content is independently created and is an object, each piece of content may have its own tags and indexing. Similarly, each piece of content can be shared with different people or systems and can be used for other purposes individually and independently.

Implementation of Editor in HTML Page

An item in a document can be content, an object, a Presenter Container, or anything used to construct a document.

An html DIV element may be used to implement a node in the Relationship Net. When a user finishes dragging an item around and drops it, the DIV's position attribute is used to record its <x, y, z> positions, also the height, width, and depth attributes are used to record the item's Cover Box dimensions. All of an item's information in the Relationship Net may be stored inside the DIV's attribute fields.

When a user adds content into an item, the content is saved inside the DIV's content field.

When a user drags an item around, the x position and y position of an item are changed. When the user drags the border of an item the height or width is changed. All changes are recorded in the DIV. The DIV implements Relationship Net 600.

When a user wants to save an edited document, the whole html page, which consists of all DIVs is stored into a database in Repository 180.

When the user opens a document for editing, the html is loaded from the database. After the page is loaded, the editor scans all the DIVs in the html document and shows them inside the editor with the stored attributes. The html implements functions shown in FIG. 1.

When a document is published and a reader reads the online document, again the html is loaded from the database. After the page is loaded, view software scans all the DIVs in the html document and shows them in the blog page. The html implements functions in FIG. 1 accordingly. However, in editor mode the DIVs are rendered in editor mode, with border, handler, and layer controls presented for the user to manipulate the block. Data integration channel 190 may be carried out separately from the HTML.

Each DIV has attributes for the backend to index into, for example, blocktype can be text, image, video etc. The blocktype specifies which content is needed from the backend. The DIV elements implement DIO 120 so items on the editor can be saved object by object and recovered object by object.

For online implementations (for example where the user accesses the editor via a website using a web browser), HTML may be used to carry out all editor functions described previously.

Figure 10:
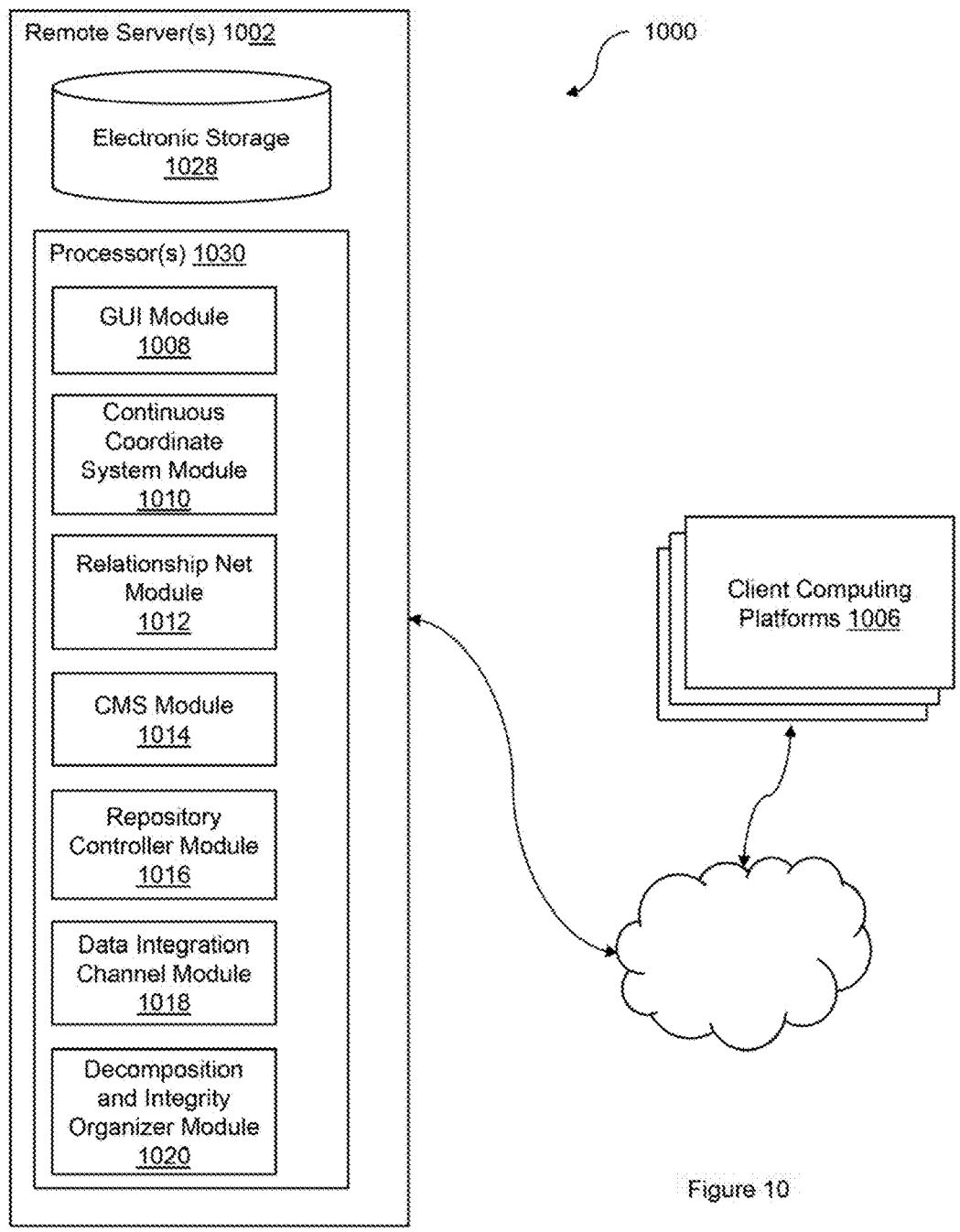
FIG. 10 is a network topology for generating online documents, in an embodiment

FIG. 10 illustrates a system 1000 configured to generate online documents, in an embodiment. The system illustrated in FIG. 10 is one embodiment of the system illustrated in FIG. 1, with the various functional elements generally implemented as modules. Generating online documents may include transmitting information over a network. Remote server(s) 1002 may be configured to communicate with one or more client computing platforms 1006 according to a client/server architecture. Users may access system 1000 via client computing platforms 1006. Remote server(s) 1002 may be a stand-alone system or a part of a larger system such as a website or other channel through which users generate online documents. The Remote server(s) 1002 may store content and related information for display as web sites and provide editing tools to client users to manipulate the content and generate web sites and other online documents.

System 1000 is only one example of a suitable computing environment and is not intended to suggest any limitation as to the scope of use or functionality of the features described herein. The remote server(s) 1002 are configured to provide a WYSIWYG online document/website editor that provides complete freedom in document/site functionality and placement of site/document objects and tools, and to execute one or more computer program modules. In implementations, remote server(s) 1002 may be configured to receive user requests to display online documents. The computer program modules may include one or more of a GUI module 1008, a Continuous Coordinate System module 1010, a Relationship Net module 1012, a CMS module 1014, a Repository Controller module 1016, a Data Integration Channel module 1018, and/or a Decomposition and Integrity Organizer module 1020. As noted, the client computing platform(s) 1006 may include one or more computer program modules that are the same as or similar to the computer program modules of the Remote server(s) 1002 to facilitate generation of online documents.

GUI module 1008 may be configured to display on a user device display a document for display to other users over a network as a website portion and to display options for a user to manipulate the document and be further configured to receive user input via the user device display. The options displayed by the graphical user interface module may include one or more content objects configured to be placed in a desired location in the document Continuous Coordinate System module 1010 may be configured to track absolute positions of the content objects placed in the document, the positions comprising horizontal position, vertical position, and layer, such that locations of content objects in the document are tracked without reference to other content objects. In other words, content object placement may not be tracked based on position relative to other content objects (i.e., content object 1 is to the left of content object 2) or on a slot occupied (e.g. content object 1 is positioned in column 1, content object 2 is positioned in column 2), but rather based on information that fully defines position of the content objects in the document area (e.g. x, y, z coordinates for the upper-left corner of the content object plus height and width and knowledge that the content object shape is rectangular), which allows content objects to partially (or fully) overlap/overlay one another without restriction.

Relationship Net module 1012 may be configured to record attributes of the working area in a net root and to record manipulations of the document in nodes for subsequent restoration of a given manipulated document to the user device display via the graphical user interface module, wherein the information relating to manipulations of the document comprises, for each manipulation of the working area, manipulation location information, manipulation size information, and manipulation content information.

CMS module 1014 may be configured to manage received user input content by saving and deleting content in the repository, converting content formats for storage and/or display, and processing the user input content.

Repository Controller module 1016 may be configured to manage the repository by keeping an indexing system for quick information storage and retrieval and managing the repository's database and file system.

Data Integration Channel module 1018 may be configured to interface between the repository and third-party applications.

Decomposition and Integrity Organizer module 1020 may be configured to provide information to the graphical user interface module to determine what options are displayed and how they are displayed, and to send at least some of the received user input to the repository.

In some implementations, the Remote server(s) 1002 and client computing platforms 1006 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which servers 1002 and client computing platforms 1006 may be operatively linked via some other communication media.

A given client computing platform 1006 may include one or more processors configured to execute computer program modules. The computer program modules may be configured to enable an expert or user associated with the given client computing platform 1006 to interface with system 1000, and/or provide other functionality attributed herein to client computing platforms 1006. By way of non-limiting example, the given client computing platform 1006 may include one or more of a desktop computer, a laptop computer, a handheld computer, a tablet computing platform, a NetBook, a Smartphone, a gaming console, and/or other computing platforms.

Remote server(s) 1002 may include electronic storage 1004, one or more processors 1030, and/or other components. Remote server(s) 1002 may include communication lines, or ports to enable the exchange of information with a network and/or other computing platforms. Illustration of Remote server(s) 1002 in FIG. 10 is not intended to be limiting. Remote server(s) 1002 may include a plurality of hardware, software, and/or firmware components operating together to provide the functionality attributed herein to remote server(s) 1002. For example, Remote server(s) 1002 may be implemented by a cloud of computing platforms operating together as remote server(s) 1002.

Electronic storage 1004 may comprise non-transitory storage media that electronically stores information. The electronic storage media of electronic storage 1004 may include one or both of system storage that is provided integrally (i.e., substantially non-removable) with Remote server(s) 1002 and/or removable storage that is removably connectable to remote server(s) 1002 via, for example, a port (e.g., a USB port, a firewire port, etc.) or a drive (e.g., a disk drive, etc.). Electronic storage 1004 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 1004 may include one or more virtual storage resources (e.g., cloud storage, a virtual private network, and/or other virtual storage resources). Electronic storage 1004 may store software algorithms, information determined by processor 1026, information received from remote server(s) 1002, information received from client computing platforms 1006 and/or advertisement provider(s) 1030, and/or other information that enables Remote server(s) 1002 to function as described herein.

Processor(s) 1026 is configured to provide information processing capabilities in Remote server(s) 1002. As such, processor 1026 may include one or more of a digital processor, an analog processor, a digital circuit designed to process information, an analog circuit designed to process information, a state machine, and/or other tools for electronically processing information. Although processor 1026 is shown in FIG. 10 as a single entity, this is for illustrative purposes only. In some implementations, processor 1026 may include a plurality of processing units. These processing units may be physically located within the same device, or processor 1026 may represent processing functionality of a plurality of devices operating in coordination. The processor 1026 may be configured to execute modules 1008, 1010, 1012, 1014, 1016, 1018, and 1020. Processor 2126 may be configured to execute modules 1008, 1010, 1012, 1014, 1016, 1018, and 1020 by software; hardware; firmware; some combination of software, hardware, and/or firmware; and/or other tools for configuring processing capabilities on processor 1026. As used herein, the term "module" may refer to any component or set of components that perform the functionality attributed to the module. This may include one or more physical processors during execution of processor readable instructions, the processor readable instructions, circuitry, hardware, storage media, or any other components.

Figure 11:
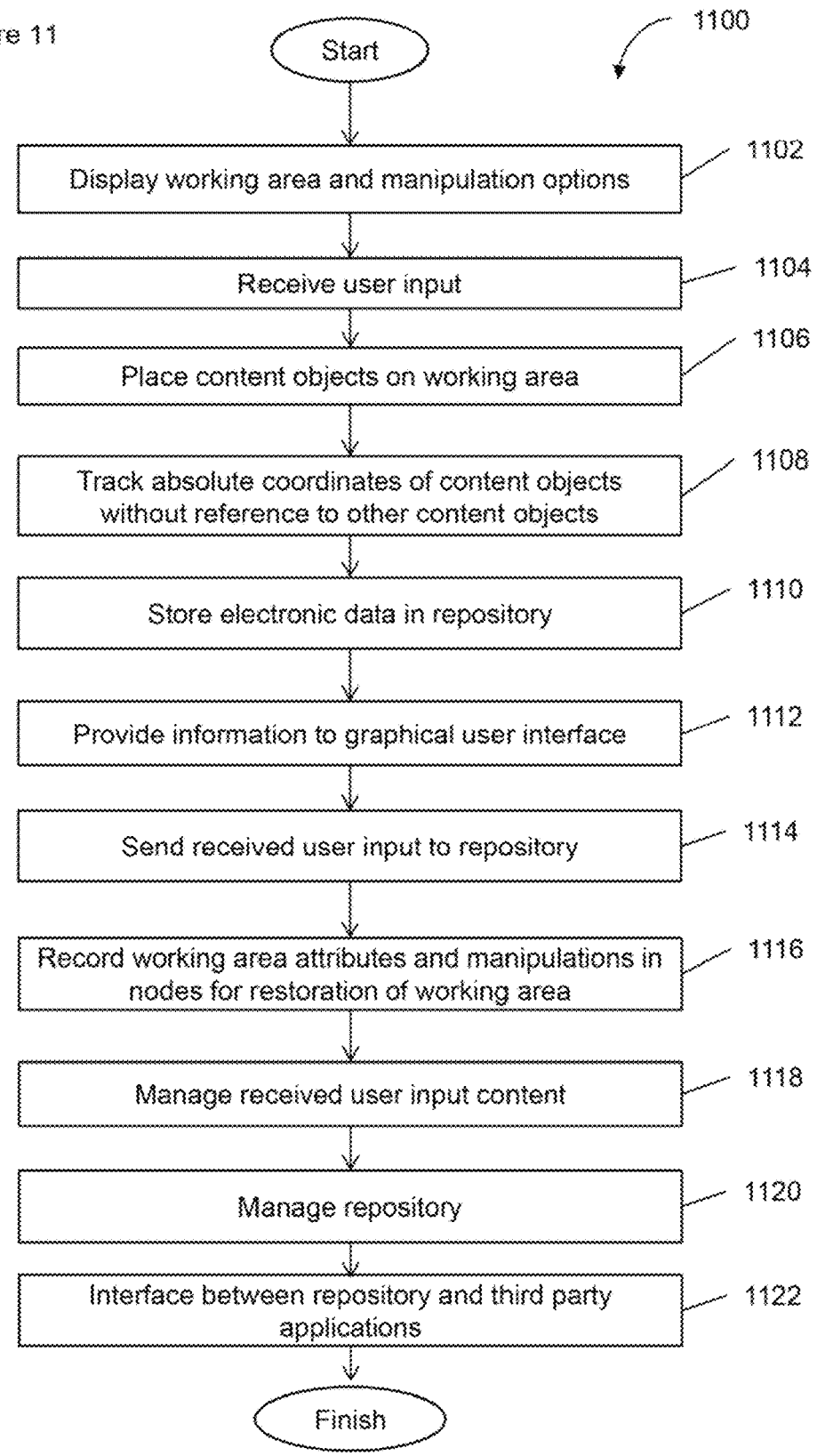
FIG. 11 shows a method for generating online documents, in an embodiment.

FIG. 11 depicts an embodiment of a method 1100 for generating online documents. One skilled in the art will appreciate that the following method is presented as an exemplary non-limiting embodiment, where in other embodiments steps may be performed in various orders, combined, omitted, and/or additional steps may be included.

In some embodiments, method 1100 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 1100 in response to instructions stored electronically on an electronic storage medium. The one or more processing devices may include one or more devices configured through hardware, firmware, and/or software to be specifically designed for execution of one or more of the operations of method 1100.

At step 1102, a document and manipulation options are displayed on a user device display for display to other users over a network as a website portion and for a user to manipulate the document, respectively. The manipulation options displayed may include one or more content objects. Step 1102 may be performed by a GUI module that is the same as or similar to GUI module 1008, in accordance with one or more implementations.

At step 1104, user input is received via the user device display. Step 1104 may be performed by a GUI module that is the same as or similar to GUI module 1008, in accordance with one or more implementations.

At step 1106, at least one of the content objects is placed in a desired location on the working area. Step 1106 may be performed by a GUI module that is the same as or similar to GUI module 1008, in accordance with one or more implementations.

At step 1108, absolute positions of content objects placed in the document are tracked without reference to other content objects, the positions comprising horizontal position, vertical position, and layer. Step 1108 may be performed by a Continuous Coordinate System module that is the same as or similar to Continuous Coordinate System module 1010, in accordance with one or more implementations.

At step 1110, electronic data is stored in a repository. Step 1110 may be performed by a repository controller module that is the same as or similar to repository controller module 1016, in accordance with one or more implementations.

At step 1112, information is provided to the graphical user interface module to determine what options are displayed and how they are displayed. Step 1112 may be performed by a decomposition and integrity organizer module that is the same as or similar to decomposition and integrity organizer module 1020, in accordance with one or more implementations.

At step 1114, received user input is sent to the repository. Step 1114 may be performed by a decomposition and integrity organizer module that is the same as or similar to decomposition and integrity organizer module 1020, in accordance with one or more implementations.

At step 1116, document attributes and manipulations are recorded in nodes for subsequent restoration of a given manipulated document to the user device display via the graphical user interface module. Attributes of the working area are recorded in a net root. The information relating to manipulations of the document may include, for each manipulation of the working area, manipulation location information, manipulation size information, and manipulation content information. Step 1116 may be performed by a Relationship Net module that is the same as or similar to Relationship Net module 1012, in accordance with one or more implementations.

At step 1118, received user input content is managed by saving and deleting content in the repository, converting content formats for storage and/or display, and processing the user input content. Step 1118 may be performed by a content management system module that is the same as or similar to content management system module 1014, in accordance with one or more implementations.

At step 1120, the repository is managed by keeping an indexing system for quick information storage and retrieval and managing the repository's database and file system. Step 1120 may be performed by a repository controller module that is the same as or similar to repository controller module 1016, in accordance with one or more implementations.

At step 1122, the repository is interfaced with third party applications. Step 1122 may be performed by a data integration channel module that is the same as or similar to data integration channel module 1018, in accordance with one or more implementations.

Figure 12:
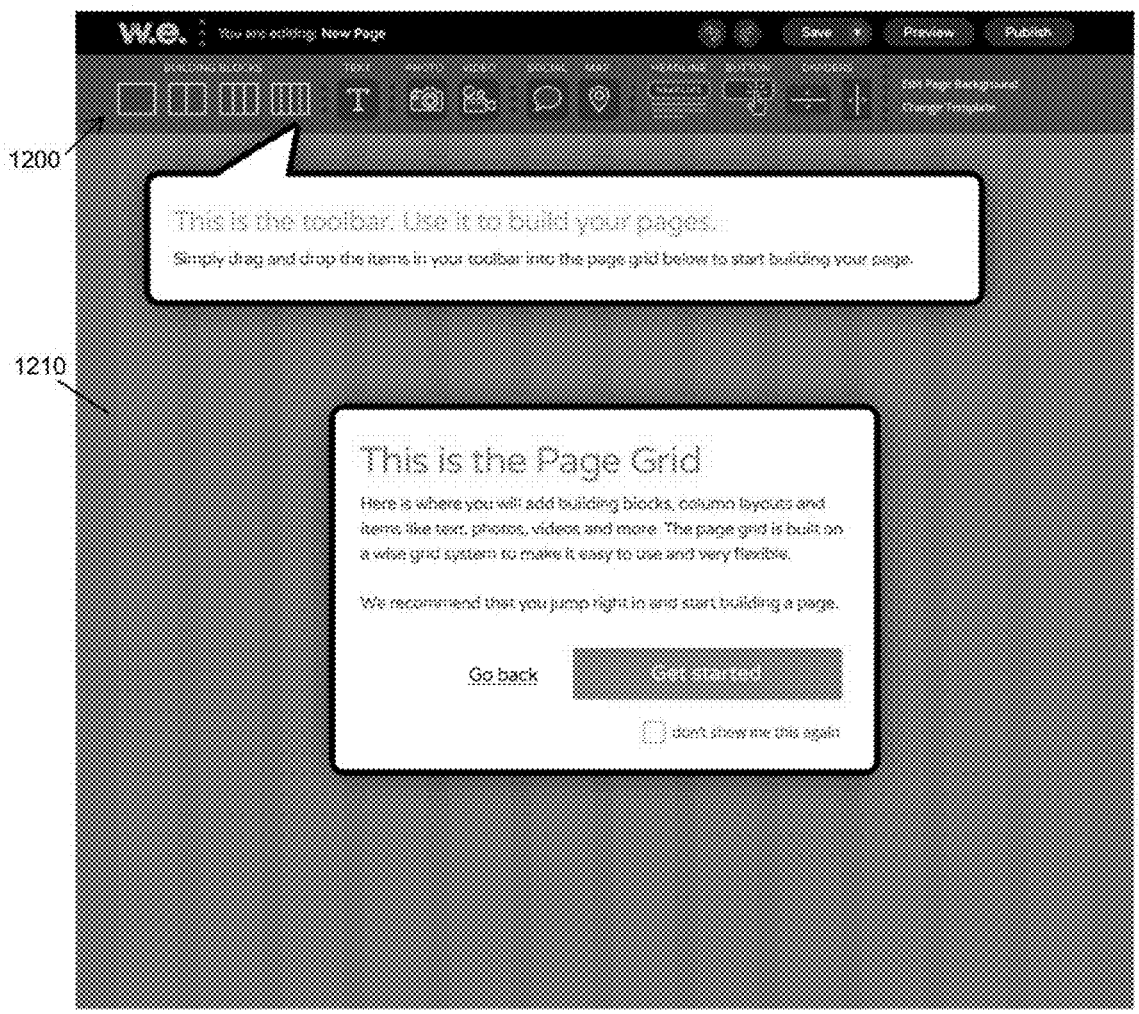
FIGS. 12-13 illustrate a WYSIWIG editor GUI, in an embodiment.
Figure 13:
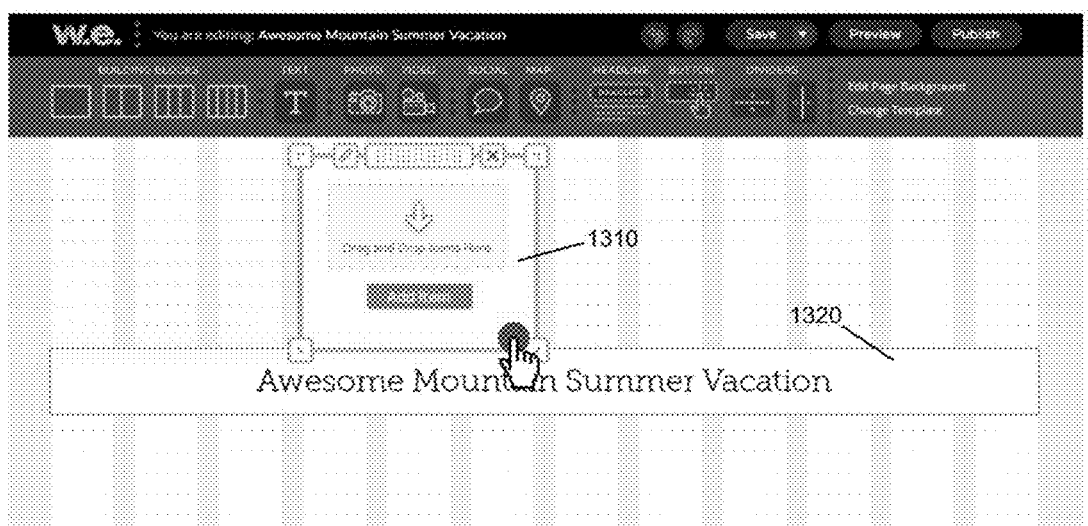

FIGS. 12-13 illustrate a WYSIWIG editor GUI, in an embodiment. A toolbar holds tools 1200 for manipulating the document 1210, for example by dragging a text, photo or video object onto the document in a desired position. FIG. 13 shows a text object 1320 dropped onto the document and a single column building block/subarea 1310 dropped onto the document and selected, with wrap-around editing tools shown. Objects such as text blocks, photos, etc. can be dragged onto or inserted in subarea 1310 as with the document.

In the foregoing specification, embodiments have been described with reference to specific embodiments. However, one of ordinary skill in the art appreciates that various modifications and changes can be made without departing from the scope of the invention. The invention encompasses every possible combination of the various features of each embodiment disclosed. One or more of the elements described herein with respect to various embodiments can be implemented in a more separated or integrated manner than explicitly described, or even removed or rendered as inoperable in certain cases, as is useful in accordance with a particular application. Accordingly, the specification and figures are to be regarded in an illustrative rather than a restrictive sense, and all such modifications are intended to be included within the scope of invention.

Although the invention has been described with respect to specific embodiments thereof, these embodiments are merely illustrative, and not restrictive of the invention. The description herein of illustrated embodiments of the invention is not intended to be exhaustive or to limit the invention to the precise forms disclosed herein (and in particular, the inclusion of any particular embodiment, feature or function is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment," "an embodiment," or "a specific embodiment" or similar terminology means that a particular feature, structure, or characteristic described in connection with the embodiment is included in at least one embodiment and may not necessarily be present in all embodiments. Thus, respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Any suitable programming language can be used to implement the routines, methods or programs of embodiments of the invention described herein, including C, C++, Java, Python, assembly language, etc. Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nano-engineered systems, components and mechanisms may be used. In general, the functions of the invention can be achieved by any means as is known in the art. For example, distributed or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example, only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code).

A "processor" includes any, hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

Furthermore, the term "or" as used herein is generally intended to mean "and/or" unless otherwise indicated. As used herein, a term preceded by "a" or "an" (and "the" when antecedent basis is "a" or "an") includes both singular and plural of such term (i.e., that the reference "a" or "an" clearly indicates only the singular or only the plural). Also, as used in the description herein, the meaning of "in" includes "in" and "on" unless the context clearly dictates otherwise.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

The invention claimed is:
1. A system for generating online documents, comprising:
one or more computing devices comprising one or more processors and configured to execute modules, the modules comprising:
a graphical user interface configured to display:
a document on a working area, the document comprising an <x,y,z> coordinate system; and a toolbox, the toolbox comprising drag and drop content tools for a user to manipulate the document by placing one or more content objects at desired positions within on the coordinate system of the document on the working area; and a continuous coordinate system configured:

to assign a position within the coordinate system for each of the one or more content objects placed in the document on the working area based on a top left corner of a cover box for each of the one or more content objects, the cover box for each of the one or more content objects comprising:

a rectangle such that it can fit the content object;

dynamically display the document according to a difference in size between a first screen on which the document was created and a second screen on which the document is displayed, wherein when the difference in size does not exceed a threshold, creating a resized document by resizing the coordinate system and the one or more content objects according to a ratio between the size of the first screen and the size of the second screen and displaying the resized document on the second screen, and wherein when the difference in size exceeds the threshold, assigning each of the one or more content objects to one or more groups by:

setting the z coordinate of the position of each of the one or more content objects to zero, sequentially scanning the document left to right at each y value within the coordinate system and if the top left corner of one of the one or more cover boxes of the one or more content objects is encountered:

if the encountered content object is unmarked, marking the content object in sequential order;

sequentially scanning the content box of the marked content left to right at each y value within the content box of the marked content and for each content object having a cover box at least fifty percent covered by the cover box of the marked content marking the content object in sequential order, if the encountered content object is marked, continuing sequentially scanning the document and displaying the content objects on the second screen in a stacked arrangement and in sequential order from top to bottom.

2. The system of claim 1, further comprising:

a repository configured to store the one or more content objects; and a decomposition and integrity organizer module configured to provide information to the graphical user interface module to determine what tools are displayed.

3. The system of claim 1, further comprising a relationship net module configured to record attributes of the document and the one or more content objects in nodes for subsequent restoration of the document via the graphical user interface, wherein the information attributes of relating to the one or more content objects manipulations of the working area comprises:

for each manipulation of the working area, manipulation position coordinates: location information, manipulation size information- and manipulation content body information.

4. The system of claim 1, wherein a first content object of the one or more content objects is configured for at least one of placement overlapping a second content object of the one or more content objects and and/or within other the second content object of the one or more content objects.

5. The system of claim 4, wherein the first content object is configured for placement within the second content object, and wherein the second object is configured such that, when the second content object is moved from a first position on the document working space to a second position on the document, the first content object moves with the second content object.

6. The system of claim 1, wherein the continuous coordinate system is further configured to display the document on the second screen without resizing the coordinate system of the document and the one or more content objects when the second display and the first display are the same size.

7. The system of claim 1, wherein the cover box of each of the one or more content objects comprises:

a first pair of sides are parallel with a horizontal axis of the document; and a second pair of sides parallel with a vertical axis of the document.

8. The system of claim 1, wherein the document comprises an area, and wherein the graphical user interface module is further configured to expand the document area when the user places a content object of the one or more content objects in a location outside of the document area.

9. The system of claim 2, further comprising: a repository controller module configured to manage received user input content by saving and deleting the one or more content objects in the repository; and, a content management system module configured to convert a format of at least one of the one or more content objects.

10. The system of claim 9, wherein the content management system module is further configured to provide at least one of spell checking, content auto-generation, content search engine optimization, content indexing, content matching, data mining, and data analysis.

11. The system of claim 9, wherein the repository comprises:

a database; and a file system, and wherein the repository controller is further configured to manage the repository by keeping an indexing system managing the database and file system.

12. The system of claim 1, further comprising a data integration channel module configured to interface between the repository and third party applications.

13. The system of claim 1, wherein the tools displayed by the graphical user interface module comprise editor tools wrapped around at least one of the one or more content objects.

14. The system of claim 3, wherein the relationship net module comprises a net root node containing a unique ID assigned to the document.

15. The system of claim 3, wherein the relationship net module further comprises net root attributes of the working area comprise comprising at least one of a document name, author information, a date/time of document creation, a date/time of last update, a thumbnail, and a document description.

16. The system of claim 3, wherein the relationship net module further comprises a node for each of the one or more content objects within the document, each node for each of the one or content objects comprising:

a location within the continuous coordinate system of the top left corner of the cover box and a size information comprising a width of the cover box, a height of the cover box and a depth of the cover box.

17. The system of claim 16, wherein each node for each of the one or more content objects further comprises at least one of a content body, content attributes, frame attributes, overlap rules, and sub nodes.

18. The system of claim 16, wherein each node for each of the one or more content objects further comprises a content body comprising including at least one of date/time of creation, author, information defining a shape, information defining a color, information defining an area in the content object is displayed, an overlap rules defining a sequence, an overlap rule defining opacity and an overlap rule defining merging of the one or more content objects.

19. The system of claim 16, wherein the relationship net module is configured to implement each node for each of the one or more content objects is a DIV element in HTML, wherein the information relating to the one or more content object is stored in attribute fields of the DIV element.

20. The system of claim 19, wherein the relationship net module is further configured to:

save all DIV elements as an html page in a database, and load the html page from the database and scan the DIV elements in the html page for restoration of the document.

21. The system of claim 1, wherein the graphical user interface module is further configured to display the document to a second user over a network as a website.

22. The system of claim 1, wherein the coordinate system module is further configured to track the top left corner of the cover box for each of the one or more content objects without reference to the cover boxes of the other content objects.

23. The system of claim 16, wherein at one of nodes for each of the one or more content objects further comprises at least one of further comprises nested subnodes for a nested content object.

* * * * *